US008822101B2

(12) United States Patent
Richards et al.

(10) Patent No.: US 8,822,101 B2
(45) Date of Patent: *Sep. 2, 2014

(54) FUEL CELL MECHANICAL COMPONENTS

(71) Applicant: Bloom Energy Corporation, Sunnyvale, CA (US)

(72) Inventors: Gilbert Richards, San Jose, CA (US); David Trevisan, San Jose, CA (US); Michael Lee, Vancouver, WA (US); Jessica Mahler, Mountain View, CA (US); Ross Parker, Santa Clara, CA (US); Alex Clarabut, Sunnyvale, CA (US); Chad Pearson, Mountain View, CA (US); Arne Ballantine, Palo Alto, CA (US); David Weingaertner, Sunnyvale, CA (US); Jason Hixson, San Jose, CA (US); Fred Mitlitsky, Livermore, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/845,685

(22) Filed: Mar. 18, 2013

(65) Prior Publication Data

US 2013/0280635 A1    Oct. 24, 2013

Related U.S. Application Data

(63) Continuation of application No. 13/242,194, filed on Sep. 23, 2011, now Pat. No. 8,440,362.

(60) Provisional application No. 61/386,257, filed on Sep. 24, 2010.

(51) Int. Cl.
*H01M 8/24* (2006.01)
*H01M 8/04* (2006.01)
*H01M 8/06* (2006.01)

(52) U.S. Cl.
CPC ............... *H01M 8/249* (2013.01); *Y02E 60/50* (2013.01); *H01M 8/0675* (2013.01); *H01M 8/0662* (2013.01); *H01M 8/06* (2013.01)
USPC ........................................ 429/471; 429/512

(58) Field of Classification Search
USPC ........ 429/400–535, 163–187; 180/68.5, 65.1, 180/65.21; 221/282; 206/703; 55/483; 95/258, 286; 29/426.3, 897.3
See application file for complete search history.

(56) References Cited

U.S. PATENT DOCUMENTS

| 3,453,087 A | 7/1969 | Herp, Jr. et al. |
| 3,453,146 A | 7/1969 | Bawa et al. |

(Continued)

FOREIGN PATENT DOCUMENTS

| CN | 101147285 A | 3/2008 |
| CN | 101295792 A | 10/2008 |

(Continued)

OTHER PUBLICATIONS

Ahmad-Khantou et al., "Electrochemical & Microstructural Study of SOFC Cathodes Based on $La_{0.5}Sr_{0.3}MnO_3$ and $Pr_{0.65}Sr_{0.3}MnO_3$," Electrochemical Society Proceedings, 2001, p. 476-485, vol. 2001-2016.

(Continued)

*Primary Examiner* — Patrick Ryan
*Assistant Examiner* — Kiran Quraishi
(74) *Attorney, Agent, or Firm* — The Marbury Law Group PLLC

(57) ABSTRACT

A modular fuel cell system includes a base, at least four power modules arranged in a row on the base, and a fuel processing module and power conditioning module arranged on at least one end of the row on the base. Each power module includes a separate cabinet which contains at least one fuel cell stack located in a hot box. The power modules are electrically and fluidly connected to the at least one fuel processing and power conditioning modules through the base.

23 Claims, 18 Drawing Sheets

(56) References Cited

U.S. PATENT DOCUMENTS

| | | |
|---|---|---|
| 3,488,266 A | 1/1970 | French |
| 3,527,565 A | 9/1970 | Banchik et al. |
| 3,531,263 A | 9/1970 | Sederquist |
| 3,607,419 A | 9/1971 | Keating, Jr. |
| 3,645,701 A | 2/1972 | Banchik et al. |
| 3,718,506 A | 2/1973 | Fischer et al. |
| 3,746,658 A | 7/1973 | Porta et al. |
| 3,972,731 A | 8/1976 | Bloomfield et al. |
| 3,973,993 A | 8/1976 | Bloomfield et al. |
| 3,976,506 A | 8/1976 | Landau |
| 3,982,962 A | 9/1976 | Bloomfield |
| 3,990,912 A | 11/1976 | Katz |
| 4,001,041 A | 1/1977 | Menard |
| 4,004,947 A | 1/1977 | Bloomfield |
| 4,041,210 A | 8/1977 | Van Dine |
| 4,052,532 A | 10/1977 | Tannenberger |
| 4,098,722 A | 7/1978 | Cairns et al. |
| 4,182,795 A | 1/1980 | Baker et al. |
| 4,190,559 A | 2/1980 | Retallick |
| 4,272,353 A | 6/1981 | Lawrance et al. |
| 4,315,893 A | 2/1982 | McCallister |
| 4,342,816 A | 8/1982 | Kothmann et al. |
| 4,365,007 A | 12/1982 | Maru et al. |
| 4,374,184 A | 2/1983 | Somers et al. |
| 4,402,871 A | 9/1983 | Retallick |
| 4,426,269 A | 1/1984 | Brown et al. |
| 4,430,304 A | 2/1984 | Spurrier et al. |
| 4,459,340 A | 7/1984 | Mason |
| 4,473,517 A | 9/1984 | Goedtke et al. |
| 4,473,622 A | 9/1984 | Chludzinski et al. |
| 4,522,894 A | 6/1985 | Hwang et al. |
| 4,532,192 A | 7/1985 | Baker et al. |
| 4,539,267 A | 9/1985 | Sederquist |
| 4,548,875 A | 10/1985 | Lance et al. |
| 4,554,223 A | 11/1985 | Yokoyama et al. |
| 4,567,117 A | 1/1986 | Patel et al. |
| 4,575,407 A | 3/1986 | Diller |
| 4,647,516 A | 3/1987 | Matsumura et al. |
| 4,654,207 A | 3/1987 | Preston |
| 4,657,829 A | 4/1987 | McElroy et al. |
| 4,670,359 A | 6/1987 | Beshty et al. |
| 4,678,723 A | 7/1987 | Wertheim |
| 4,686,158 A | 8/1987 | Nishi et al. |
| 4,696,871 A | 9/1987 | Pinto |
| 4,702,973 A | 10/1987 | Marianowski |
| 4,716,023 A | 12/1987 | Christner et al. |
| 4,722,873 A | 2/1988 | Matsumura |
| 4,728,584 A | 3/1988 | Isenberg |
| 4,737,161 A | 4/1988 | Szydlowski et al. |
| 4,792,502 A | 12/1988 | Trocciola et al. |
| 4,804,592 A | 2/1989 | Vanderborgh et al. |
| 4,808,491 A | 2/1989 | Reichner |
| 4,810,472 A | 3/1989 | Andrew et al. |
| 4,812,373 A | 3/1989 | Grimble et al. |
| 4,820,314 A | 4/1989 | Cohen et al. |
| 4,824,740 A | 4/1989 | Abrams et al. |
| 4,828,940 A | 5/1989 | Cohen et al. |
| 4,847,051 A | 7/1989 | Parenti, Jr. |
| 4,847,173 A | 7/1989 | Mitsunnaga et al. |
| 4,848,034 A * | 7/1989 | Pace .................. 49/465 |
| 4,865,926 A | 9/1989 | Levy et al. |
| 4,898,792 A | 2/1990 | Singh et al. |
| 4,904,548 A | 2/1990 | Tajima |
| 4,913,982 A | 4/1990 | Kotchick et al. |
| 4,917,971 A | 4/1990 | Farooque |
| 4,925,745 A | 5/1990 | Remick et al. |
| 4,933,242 A | 6/1990 | Koga et al. |
| 4,983,471 A | 1/1991 | Reichner et al. |
| 4,994,331 A | 2/1991 | Cohen |
| 5,009,967 A | 4/1991 | Scheffler |
| 5,034,287 A | 7/1991 | Kunz |
| 5,039,579 A | 8/1991 | Kinoshita |
| 5,047,299 A | 9/1991 | Shockling |
| 5,077,148 A | 12/1991 | Schora et al. |
| 5,079,105 A | 1/1992 | Bossel |
| 5,082,751 A | 1/1992 | Reichner |
| 5,082,752 A | 1/1992 | Koga et al. |
| 5,084,363 A | 1/1992 | Reiser |
| 5,084,632 A | 1/1992 | Shinbara |
| 5,091,075 A | 2/1992 | O'Neill et al. |
| 5,100,743 A | 3/1992 | Narita et al. |
| 5,143,800 A | 9/1992 | George et al. |
| 5,162,167 A | 11/1992 | Minh et al. |
| 5,169,730 A | 12/1992 | Reichner et al. |
| 5,170,124 A | 12/1992 | Blair et al. |
| 5,171,645 A | 12/1992 | Khandkar |
| 5,175,062 A | 12/1992 | Farooque et al. |
| 5,187,024 A | 2/1993 | Matsumura |
| 5,192,334 A | 3/1993 | Rohr et al. |
| 5,212,022 A | 5/1993 | Takahashi et al. |
| 5,213,910 A | 5/1993 | Yamada |
| 5,215,946 A | 6/1993 | Minh |
| 5,227,256 A | 7/1993 | Marianowski et al. |
| 5,232,792 A | 8/1993 | Reznikov |
| 5,246,791 A | 9/1993 | Fisher et al. |
| 5,256,499 A | 10/1993 | Minh et al. |
| 5,270,127 A | 12/1993 | Koga et al. |
| 5,273,837 A | 12/1993 | Aiken et al. |
| 5,290,323 A | 3/1994 | Okuyama et al. |
| 5,290,642 A | 3/1994 | Minh et al. |
| 5,302,470 A | 4/1994 | Okada et al. |
| 5,324,452 A | 6/1994 | Allam et al. |
| 5,328,779 A | 7/1994 | Tannenberger et al. |
| 5,340,664 A | 8/1994 | Hartvigsen |
| 5,342,705 A | 8/1994 | Minh et al. |
| 5,344,721 A | 9/1994 | Sonai et al. |
| 5,346,779 A | 9/1994 | Nakazawa |
| 5,348,814 A | 9/1994 | Niikura et al. |
| 5,360,679 A | 11/1994 | Buswell et al. |
| 5,366,819 A | 11/1994 | Hartvigsen et al. |
| 5,368,667 A | 11/1994 | Minh et al. |
| 5,441,821 A | 8/1995 | Merritt et al. |
| 5,453,146 A | 9/1995 | Kemper |
| 5,470,360 A | 11/1995 | Sederquist |
| 5,498,487 A | 3/1996 | Ruka et al. |
| 5,501,914 A | 3/1996 | Satake et al. |
| 5,505,824 A | 4/1996 | McElroy |
| 5,516,344 A | 5/1996 | Corrigan |
| 5,518,829 A | 5/1996 | Satake et al. |
| 5,527,631 A | 6/1996 | Singh et al. |
| 5,532,072 A | 7/1996 | Spaeh et al. |
| 5,573,867 A | 11/1996 | Zafred et al. |
| 5,589,017 A | 12/1996 | Minh |
| 5,589,285 A | 12/1996 | Cable et al. |
| 5,601,937 A | 2/1997 | Isenberg |
| 5,641,585 A | 6/1997 | Lessing et al. |
| 5,686,196 A | 11/1997 | Singh et al. |
| 5,688,609 A | 11/1997 | Rostrup-Nielsen et al. |
| 5,688,610 A | 11/1997 | Spaeh et al. |
| 5,693,201 A | 12/1997 | Hsu et al. |
| 5,730,213 A | 3/1998 | Kiser et al. |
| 5,733,675 A | 3/1998 | Dederer et al. |
| 5,741,406 A | 4/1998 | Barnett |
| 5,741,605 A * | 4/1998 | Gillett et al. .................. 429/415 |
| 5,763,114 A | 6/1998 | Khandkar et al. |
| 5,773,160 A | 6/1998 | Wilkinson et al. |
| 5,914,200 A | 6/1999 | Schabert et al. |
| 5,922,488 A | 7/1999 | Marucchi-Soos et al. |
| 5,955,039 A | 9/1999 | Dowdy |
| 5,993,989 A | 11/1999 | Baozhen |
| 6,013,385 A | 1/2000 | DuBose |
| 6,051,125 A | 4/2000 | Pham et al. |
| 6,080,500 A | 6/2000 | Fuju et al. |
| 6,106,964 A | 8/2000 | Voss et al. |
| 6,106,967 A | 8/2000 | Virkar et al. |
| 6,228,521 B1 | 5/2001 | Kim et al. |
| 6,238,816 B1 | 5/2001 | Cable et al. |
| 6,280,865 B1 | 8/2001 | Eisman et al. |
| 6,287,716 B1 | 9/2001 | Hashimoto et al. |
| 6,329,090 B1 | 12/2001 | McElroy et al. |
| 6,348,278 B1 | 2/2002 | LaPierre et al. |
| 6,361,892 B1 | 3/2002 | Ruhl et al. |
| 6,376,111 B1 | 4/2002 | Mathias et al. |
| 6,383,670 B1 | 5/2002 | Edlund et al. |

(56) References Cited

U.S. PATENT DOCUMENTS

| | | |
|---|---|---|
| 6,403,245 B1 | 6/2002 | Hunt |
| 6,436,562 B1 | 8/2002 | DuBose et al. |
| 6,451,466 B1 | 9/2002 | Grasso et al. |
| 6,464,586 B1 * | 10/2002 | Kamata et al. ............... 463/46 |
| 6,489,050 B1 | 12/2002 | Ruhl et al. |
| 6,495,279 B1 | 12/2002 | Bogicevic et al. |
| 6,531,243 B2 | 3/2003 | Thom |
| 6,558,831 B1 | 5/2003 | Doshi et al. |
| 6,582,842 B1 | 6/2003 | King |
| 6,582,845 B2 | 6/2003 | Helfinstine et al. |
| 6,592,965 B1 | 7/2003 | Gordon |
| 6,605,316 B1 | 8/2003 | Visco |
| 6,623,880 B1 | 9/2003 | Geisbrecht et al. |
| 6,656,625 B1 | 12/2003 | Thompson et al. |
| 6,677,070 B2 | 1/2004 | Kearl |
| 6,682,842 B1 | 1/2004 | Visco et al. |
| 6,691,702 B2 * | 2/2004 | Appel et al. ............ 128/202.26 |
| 6,749,958 B2 | 6/2004 | Pastula et al. |
| 6,767,662 B2 | 7/2004 | Jacobson |
| 6,787,261 B2 | 9/2004 | Ukai |
| 6,797,425 B2 | 9/2004 | Blanchet |
| 6,803,141 B2 | 10/2004 | Pham |
| 6,811,913 B2 | 11/2004 | Ruhl |
| 6,821,663 B2 | 11/2004 | McElroy et al. |
| 6,854,688 B2 | 2/2005 | McElroy et al. |
| 6,924,053 B2 | 8/2005 | McElroy |
| 6,972,161 B2 | 12/2005 | Beatty et al. |
| 6,979,511 B2 | 12/2005 | Visco |
| 7,008,465 B2 * | 3/2006 | Graham et al. .................... 95/78 |
| 7,067,208 B2 | 6/2006 | Gottmann et al. |
| 7,150,927 B2 | 12/2006 | Hickey et al. |
| 7,157,173 B2 | 1/2007 | Kwon |
| 7,255,956 B2 | 8/2007 | McElroy |
| 7,494,732 B2 | 2/2009 | Roy |
| 7,546,938 B2 | 6/2009 | Panasik et al. |
| 7,550,217 B2 | 6/2009 | Kwon |
| 7,563,503 B2 | 7/2009 | Gell |
| 7,601,183 B2 | 10/2009 | Larsen |
| 7,601,459 B2 | 10/2009 | An et al. |
| 7,713,649 B2 | 5/2010 | Hickey et al. |
| 8,440,362 B2 * | 5/2013 | Richards et al. ............. 429/471 |
| 2001/0049035 A1 | 12/2001 | Haltiner, Jr. et al. |
| 2002/0006535 A1 | 1/2002 | Woods et al. |
| 2002/0012825 A1 | 1/2002 | Sasahara et al. |
| 2002/0014417 A1 | 2/2002 | Kuehnle et al. |
| 2002/0028362 A1 | 3/2002 | Prediger et al. |
| 2002/0028367 A1 | 3/2002 | Sammes et al. |
| 2002/0058175 A1 | 5/2002 | Ruhl |
| 2002/0098406 A1 | 7/2002 | Huang et al. |
| 2002/0106544 A1 | 8/2002 | Noetzel et al. |
| 2002/0127455 A1 | 9/2002 | Pham et al. |
| 2002/0132156 A1 | 9/2002 | Ruhl et al. |
| 2002/0142208 A1 | 10/2002 | Keefer et al. |
| 2002/0192516 A1 | 12/2002 | Tajima |
| 2003/0031904 A1 | 2/2003 | Haltiner |
| 2003/0049502 A1 | 3/2003 | Dickman et al. |
| 2003/0157386 A1 | 8/2003 | Gottmann |
| 2003/0162067 A1 | 8/2003 | McElroy |
| 2003/0165732 A1 | 9/2003 | McElroy |
| 2003/0196893 A1 | 10/2003 | McElroy |
| 2003/0205641 A1 | 11/2003 | McElroy |
| 2003/0235725 A1 | 12/2003 | Haltiner et al. |
| 2004/0081859 A1 | 4/2004 | McElroy et al. |
| 2004/0089438 A1 | 5/2004 | Valensa et al. |
| 2004/0131912 A1 | 7/2004 | Keefer et al. |
| 2004/0180253 A1 * | 9/2004 | Fisher ............................ 429/34 |
| 2004/0191595 A1 | 9/2004 | McElroy |
| 2004/0191597 A1 | 9/2004 | McElroy |
| 2004/0191598 A1 | 9/2004 | Gottmann et al. |
| 2004/0202914 A1 | 10/2004 | Sridhar et al. |
| 2004/0217732 A1 | 11/2004 | Zhu et al. |
| 2004/0224193 A1 | 11/2004 | Mitlitsky et al. |
| 2005/0026011 A1 | 2/2005 | Suzuki et al. |
| 2005/0048334 A1 | 3/2005 | Sridhar et al. |
| 2005/0048336 A1 | 3/2005 | Takebe et al. |
| 2005/0048338 A1 | 3/2005 | Kobayashi et al. |
| 2005/0056412 A1 | 3/2005 | Reinke et al. |
| 2005/0074650 A1 | 4/2005 | Sridhar et al. |
| 2005/0164051 A1 | 7/2005 | Venkataraman et al. |
| 2005/0170235 A1 | 8/2005 | Hu et al. |
| 2005/0227134 A1 | 10/2005 | Nguyen |
| 2005/0249988 A1 | 11/2005 | Pearson |
| 2005/0271919 A1 | 12/2005 | Hata et al. |
| 2006/0008682 A1 | 1/2006 | McLean et al. |
| 2006/0040168 A1 | 2/2006 | Sridhar |
| 2006/0147771 A1 | 7/2006 | Russell et al. |
| 2006/0166070 A1 | 7/2006 | Hickey et al. |
| 2006/0188763 A1 * | 8/2006 | Bai et al. ......................... 429/22 |
| 2006/0210841 A1 * | 9/2006 | Wallace et al. ................. 429/12 |
| 2006/0216575 A1 | 9/2006 | Cassidy |
| 2006/0222929 A1 | 10/2006 | Hickey et al. |
| 2006/0248799 A1 | 11/2006 | Bandhauer et al. |
| 2006/0251934 A1 | 11/2006 | Valensa et al. |
| 2006/0251939 A1 | 11/2006 | Bandhauer et al. |
| 2006/0251940 A1 | 11/2006 | Bandhauer et al. |
| 2007/0017368 A1 | 1/2007 | Levan et al. |
| 2007/0017369 A1 | 1/2007 | Levan et al. |
| 2007/0045125 A1 | 3/2007 | Hartvigsen et al. |
| 2007/0082254 A1 | 4/2007 | Hiwatashi |
| 2007/0141423 A1 | 6/2007 | Suzuki |
| 2007/0141443 A1 | 6/2007 | Brown |
| 2007/0141444 A1 | 6/2007 | Brown |
| 2007/0224481 A1 | 9/2007 | Suzuki et al. |
| 2007/0237999 A1 | 10/2007 | Donahue |
| 2007/0243435 A1 | 10/2007 | Dutta |
| 2007/0259242 A1 | 11/2007 | Schaevitz et al. |
| 2007/0275292 A1 | 11/2007 | Sin Xicola et al. |
| 2007/0287048 A1 | 12/2007 | Couse et al. |
| 2008/0010959 A1 | 1/2008 | Gillingham et al. |
| 2008/0029388 A1 | 2/2008 | Elangovan |
| 2008/0038600 A1 | 2/2008 | Valensa et al. |
| 2008/0075984 A1 | 3/2008 | Badding |
| 2008/0076006 A1 | 3/2008 | Gottmann et al. |
| 2008/0096080 A1 | 4/2008 | Batawi |
| 2008/0102337 A1 | 5/2008 | Shimada |
| 2008/0254336 A1 | 10/2008 | Batawi |
| 2008/0261099 A1 | 10/2008 | Nguyen |
| 2009/0029195 A1 | 1/2009 | Gauckler |
| 2009/0029208 A1 * | 1/2009 | Katikaneni et al. ............. 429/22 |
| 2009/0053569 A1 * | 2/2009 | Perry et al. ...................... 429/26 |
| 2009/0068533 A1 | 3/2009 | Fukasawa et al. |
| 2009/0130530 A1 * | 5/2009 | Tanaka ............................ 429/34 |
| 2009/0186250 A1 | 7/2009 | Narendar et al. |
| 2009/0214919 A1 | 8/2009 | Suzuki |
| 2009/0246566 A1 * | 10/2009 | Craft et al. ...................... 429/13 |
| 2009/0291347 A1 | 11/2009 | Suzuki |
| 2010/0018396 A1 * | 1/2010 | Ding et al. ...................... 95/140 |
| 2010/0035109 A1 | 2/2010 | Weingaertner et al. |
| 2011/0281185 A1 | 11/2011 | Sridhar |

FOREIGN PATENT DOCUMENTS

| | | |
|---|---|---|
| DE | 19822697 | 10/1998 |
| EP | 0398111 A1 | 11/1990 |
| EP | 0977294 B1 | 2/2000 |
| EP | 1501146 A2 | 1/2005 |
| GB | 1048839 A | 11/1966 |
| JP | 60235365 | 11/1985 |
| JP | 3196465 A | 8/1991 |
| JP | 05-047408 | 2/1993 |
| JP | 6215778 | 8/1994 |
| JP | 2000-281438 | 10/2000 |
| JP | 2005-044727 | 2/2005 |
| KR | 20020092223 A | 12/2002 |
| KR | 20070095440 A | 9/2007 |
| KR | 20080010737 A | 1/2008 |
| KR | 20080097971 | 11/2008 |
| KR | 100886239 B1 | 2/2009 |
| KR | 20090061870 A | 6/2009 |
| WO | WO9418712 | 8/1994 |
| WO | WO2004/013258 | 2/2004 |
| WO | WO2004/092756 | 10/2004 |
| WO | WO2004/093214 | 10/2004 |

(56) References Cited

FOREIGN PATENT DOCUMENTS

| WO | WO2005/041329 | 5/2005 |
|----|---------------|--------|
| WO | WO2008/019926 | 2/2008 |
| WO | WO2009/097110 | 8/2009 |

OTHER PUBLICATIONS

Mori et al., "Lanthanum Alkaline-Earth Manganites as a Cathode Material in High-Temperature Solid Oxide Fuel Cells," Journal of the Electrochemical Society, 1999, p. 4041-4047, vol. 146.
L.G. Austin, "Cell & Stack Construction: Low Temperature Cells," Fuel Cells: A Review of Government-Sponsored Research, 1950-1964, NASA SP-120, 1967.
EG & G Services, Parsons, Inc., SAIC, Fuel Cell Handbook, 5th Edition, USDOE, Oct. 2000, p. 9-1-9.4, and 9-12-9-14.
J.M. Sedlak, et al., "Hydrogen Recovery and Purification Using the Solid Polymer Electrolyte Electrolysis Cell," Int. J. Hydrogen Energy, vol. 6, p. 45-51, 1981.
Dr. Ruhl, "Low Cost Reversible Fuel Cell System," Proceedings of the 2000 U.S. DOE Hydrogen Program Review, Jun. 15, 2000, NREL/CP-570-30535.
"Low Cost, Compact Solid Oxide Fuel Cell Generator," Technology Management Inc., (no date available), 1pg.
Low Cost, High Efficiency Reversible Fuel Cell (and Electrolyzer) Systems, Proceedings of the 2001 DOE Hydrogen Program Review NREL/CP-570-30535.
Milliken et al., "Low Cost, High Efficiency Reversible Fuel Cell Systems," Proceedings of the 2002 U.S. DOE Hydrogen Program Review, NREL/CP-610-32405.
K. Eguchi et al., Power Generation and Steam Electrolysis Characteristics of an Electrochemical Cell with a Zirconia or Ceria based Electrode, Solid State Ionics, 86 88, 1996, p. 1245-1249.
F. Mitlitsky et al., "Regenerative Fuel Cells for High Altitude Long Endurance Solar Powered Aircraft," $28^{th}$ Intersociety Energy Conversion Engineering Conference (IECED), Jul. 28, 1993, UCRL-JC-113485.
Small, Ultra Efficient Fuel Cell Systems, Advanced Technology Program, ATP 2001 Competition, Jun. 2002.
F. Mitlitsky et al., Unitized Regenerative Fuel Cells for Solar Rechargeable Aircraft and Zero Emission Vehicles, 1994 Fuel Cell Seminar, Sep. 6, 1994, UCRL-JC-117130.
Ralph et al., "Cathode Materials for Reduced-Temperature SOFCs," Journal of the Electrochemical Society, 2003, p. A1518-A1522, vol. 150.
Simmer et al., "Development of Fabrication Techniques and Electrodes for Solid Oxide Fuel Cells," Electrochemcial Society Proceedings, p. 1050-1061, vol. 2001-16.
Yamamoto et al., "Electrical Conductivity of Stabilized Zirconia with Ytterbia and Scandia," Solid State Ionics, v79, p. 137-142, Jul. 1995.
Araki et al., "Degradation Mechanism of Scandia-Stabilized Zirconia Electrolytes: Discussion based on Annealing Effects on Mechanical Strength, Ionic Conductivity, and Raman Spectrum," Solid State Ionics, v180, n28-31, p. 1484-1489, Nov. 2009.
Lybye et al., "Effect of Transition Metal Ions on the Conductivity and Stability of Stabilized Zirconia," Ceramic Engineering and Science Proceedings, v27, n4, p. 67-78, 2006.
Anonymous, "Presentation of the LabView-based Software Used in Fuel Cell Technologies Testing System," http://web.archive.org/web/20040715025135/fuelcelltechnologies.com/Support/Downloads/Tutorial.pdf, Jul. 15, 2004.
Hamburger et al., "LabView DSC Automates Fuel Cell Catalyst Research," Nov. 4, 2004, http://web.archive.org/web/20041104200039/http://bloomy.com/newsletters/fuelcellresearch.pdf.

* cited by examiner

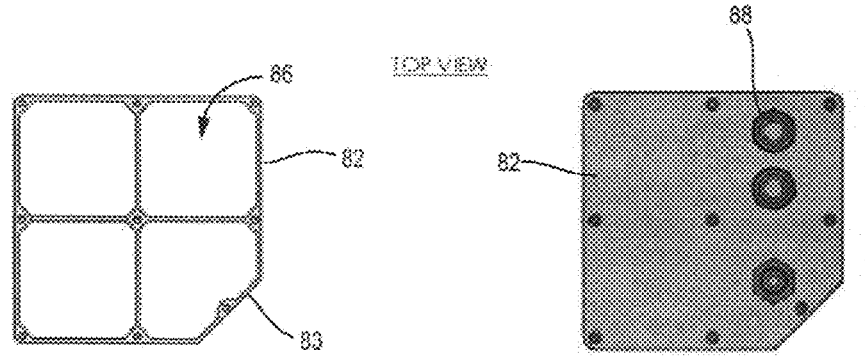
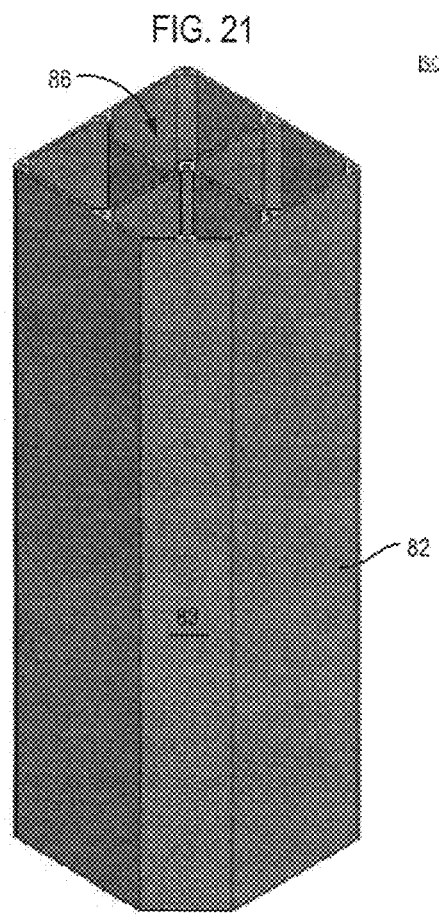
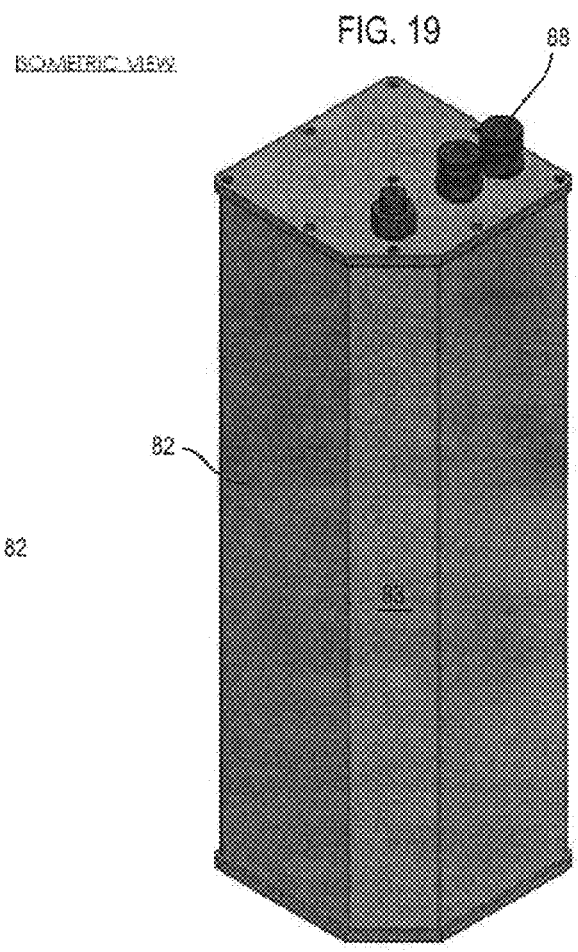
FIG. 21  FIG. 19
FIG. 20  FIG. 18

FUEL CELL MECHANICAL COMPONENTS

RELATED APPLICATIONS

This application is a continuation application of U.S. patent application Ser. No. 13/242,194, entitled "Fuel Cell Mechanical Components" filed Sep. 23, 2011, which claims priority to U.S. Provisional Application No. 61/386,257, entitled "Fuel Cell Mechanical Components" filed on Sep. 24, 2010, the entire contents of both applications are hereby incorporated by reference to provide continuity of disclosure.

BACKGROUND

The present invention is directed generally to fuel cell systems and specifically to mechanical components of the fuel cell systems.

Rapid and inexpensive installation can help to increase the prevalence of fuel cell systems. Installation costs for pour in place custom designed concrete pads, which generally require trenching for plumbing and electrical lines, can become prohibitive. Installation time is also a problem in the case of most sites since concrete pours and trenches generally require one or more building permits and building inspector reviews.

Furthermore, stationary fuel cell systems may be installed in location where the cost of real estate is quite high or the available space is limited (e.g., a loading dock, a narrow alley or space between buildings, etc.). The fuel cell system installation should have a high utilization of available space. When a considerable amount of stand-off space is required for access to the system via doors and the like, installation real estate costs increase significantly.

When the number of fuel cell systems to be installed on a site increases, one problem which generally arises is that stand-off space between these systems is required (to allow for maintenance of one unit or the other unit). The space between systems is lost in terms of it's potential to be used by the customer of the fuel cell system.

In the case of some fuel cell system designs, these problems are resolved by increasing the overall capacity of the monolithic system design. However, this creates new challenges as the size and weight of the concrete pad required increases. Therefore, this strategy tends to increase the system installation time. Furthermore, as the minimum size of the system increases, the fault tolerance of the design is reduced.

The fuel cell stacks or columns of the fuel cell systems are usually located in hot boxes (i.e., thermally insulated containers). The hot boxes of existing large stationary fuel cell systems are housed in cabinets, housings or enclosures. The terms cabinet, enclosure and housing are used interchangeably herein. The cabinets are usually made from metal. The metal is painted with either automotive or industrial powder coat paint, which is susceptible to scratching, denting and corrosion. Most of these cabinets are similar to current industrial HVAC equipment cabinets.

SUMMARY

A modular fuel cell system includes a base, at least four power modules arranged in a row on the base, and a fuel processing module and power conditioning module arranged on at least one end of the row on the base. Each power module includes a separate cabinet which contains at least one fuel cell stack located in a hot box. The power modules are electrically and fluidly connected to the at least one fuel processing and power conditioning modules through the base.

BRIEF DESCRIPTION OF THE DRAWINGS

FIG. 18 is an isometric view of a canister for the desulfurizer assembly of FIG. 17 according to an exemplary embodiment.

FIG. 19 is a top view of the canister of FIG. 18 according to an exemplary embodiment.

FIG. 20 is an isometric view of the canister of FIG. 18 with the top removed to show internal chambers according to an exemplary embodiment.

FIG. 21 is a top view of the canister of FIG. 18 with the top removed to show internal chambers according to an exemplary embodiment.

DETAILED DESCRIPTION

It is to be understood that both the foregoing general description and the following detailed description are exemplary and explanatory only, and are not restrictive of the invention as claimed.

Modular System

Figure 1:
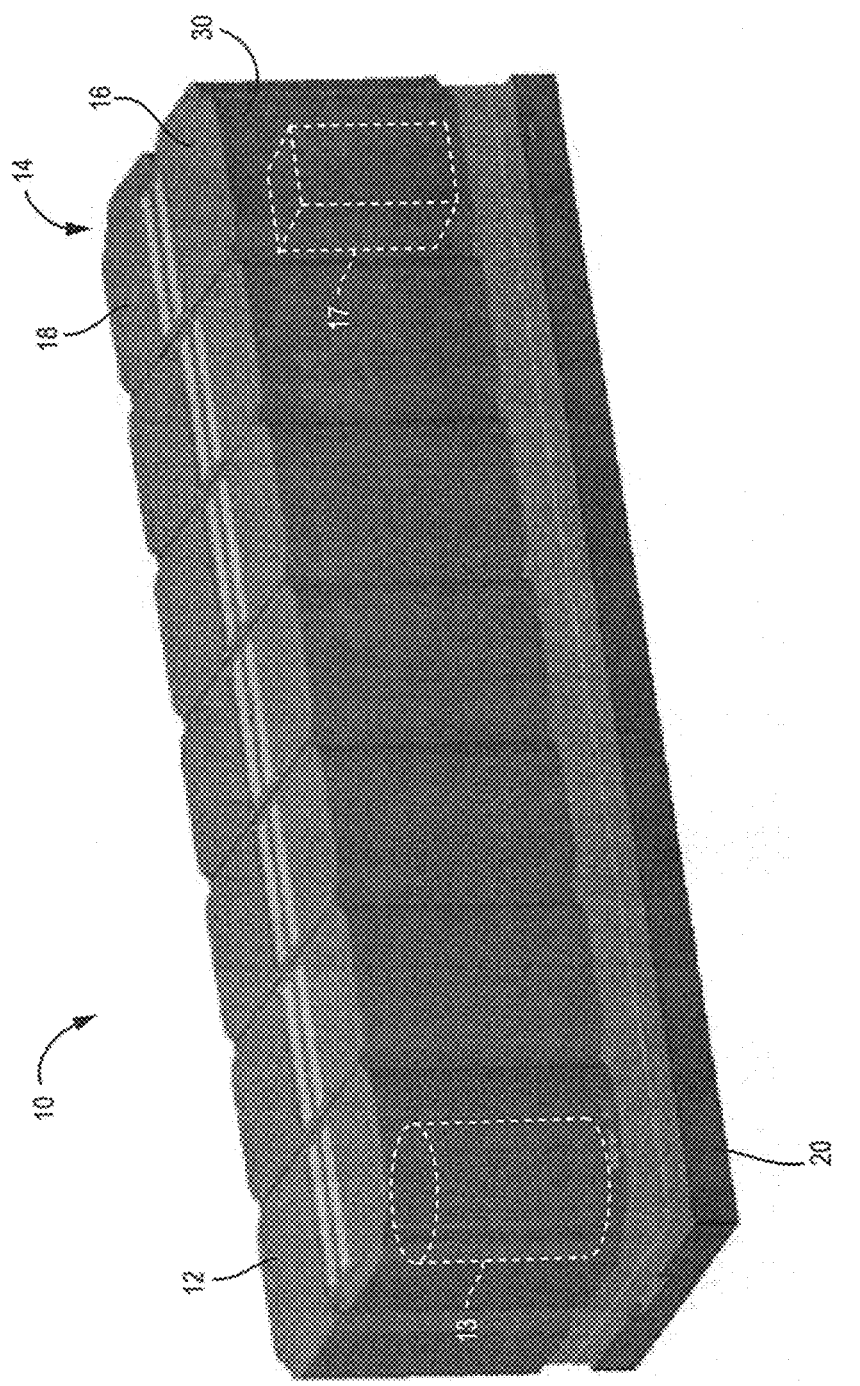
FIG. 1 is an isometric view of a modular fuel cell system enclosure according to an exemplary embodiment.

Referring to FIG. 1, a modular fuel cell system enclosure 10 is shown according to an exemplary embodiment. The modular system may contain modules and components described in U.S. patent application Ser. No. 11/656,006, filed on Jan. 22, 2007, and incorporated herein by reference in its entirety. The modular design of the fuel cell system enclosure 10 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

The modular fuel cell system enclosure 10 includes at least one (preferably more than one or plurality) of power modules 12, one or more fuel input (i.e., fuel processing) modules 16, and one or more power conditioning (i.e., electrical output) modules 18. In embodiments, the power conditioning modules 18 are configured to deliver direct current (DC). In alternative embodiments, the power conditioning modules 18 are configured to deliver alternating current (AC). In these embodiments, the power condition modules include a mechanism to convert DC to AC, such as an inverter. For example, the system enclosure may include any desired number of modules, such as 2-30 power modules, for example 3-12 power modules, such as 6-12 modules. FIG. 1 illustrates a system enclosure 10 containing six power modules 12 (one row of six modules stacked side to side), one fuel processing module 16, and one power conditioning module 18 on a common base 20. Each module 12, 16, 18 may comprise its own cabinet. Alternatively, as will be described in more detail below, modules 16 and 18 may be combined into a single input/output module 14 located in one cabinet. While one row of power modules 12 is shown, the system may comprise more than one row of modules 12. For example, the system may comprise two rows of power modules arranged back to back/end to end.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The fuel cell stacks may comprise externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The modular fuel cell system enclosure 10 also contains one or more input or fuel processing modules 16. This module 16 includes a cabinet which contains the components used for pre-processing of fuel, such as adsorption beds (e.g., desulfurizer and/or other impurity adsorption) beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may process at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in one exemplary embodiment in FIG. 1, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may comprise more than one row of modules 12. For example, as noted above, the system may comprise two rows of power modules stacked back to back.

The linear array of power modules 12 is readily scaled. For example, more or fewer power modules 12 may be provided depending on the power needs of the building or other facility serviced by the fuel cell system 10. The power modules 12 and input/output modules 14 may also be provided in other ratios. For example, in other exemplary embodiments, more or fewer power modules 12 may be provided adjacent to the input/output module 14. Further, the support functions could be served by more than one input/output module 14 (e.g., with a separate fuel processing module 16 and power conditioning module 18 cabinets). Additionally, while in the preferred embodiment, the input/output module 14 is at the end of the row of power modules 12, it could also be located in the center of a row power modules 12.

The modular fuel cell system enclosure 10 may be configured in a way to ease servicing of the system. All of the routinely or high serviced components (such as the consumable components) may be placed in a single module to reduce amount of time required for the service person. For example, a purge gas (optional) and desulfurizer material for a natural gas fueled system may be placed in a single module (e.g., fuel processing module 16 or a combined input/output module 14 cabinet). This would be the only module cabinet accessed during routine maintenance. Thus, each module 12, 14, 16, and 18 may be serviced, repaired or removed from the system without opening the other module cabinets and without servicing, repairing or removing the other modules.

For example, as described above, the enclosure 10 can include multiple power modules 12. When at least one power module 12 is taken off line (i.e., no power is generated by the stacks in the hot box 13 in the off line module 12), the remaining power modules 12, the fuel processing module 16 and the power conditioning module 18 (or the combined input/output module 14) are not taken off line. Furthermore, the fuel cell enclosure 10 may contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 may be electrically disconnected, removed from the fuel cell enclosure 10 and/or serviced or repaired without stopping an operation of the other modules in the system, allowing the fuel cell system to continue to generate electricity. The entire fuel cell system does not have to be shut down if one stack of fuel cells in one hot box 13 malfunctions or is taken off line for servicing.

Pre-Cast Base

Figure 3:
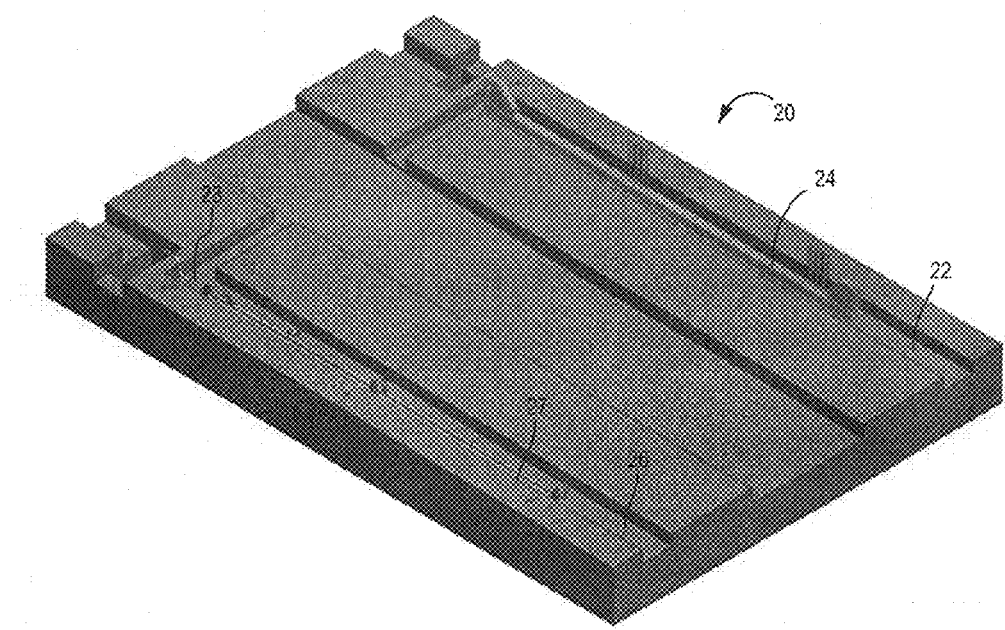
FIG. 3 is an isometric view of a portion of a pre-cast base for the fuel cell enclosure of FIG. 1 according to an exemplary embodiment.
Figure 3A:
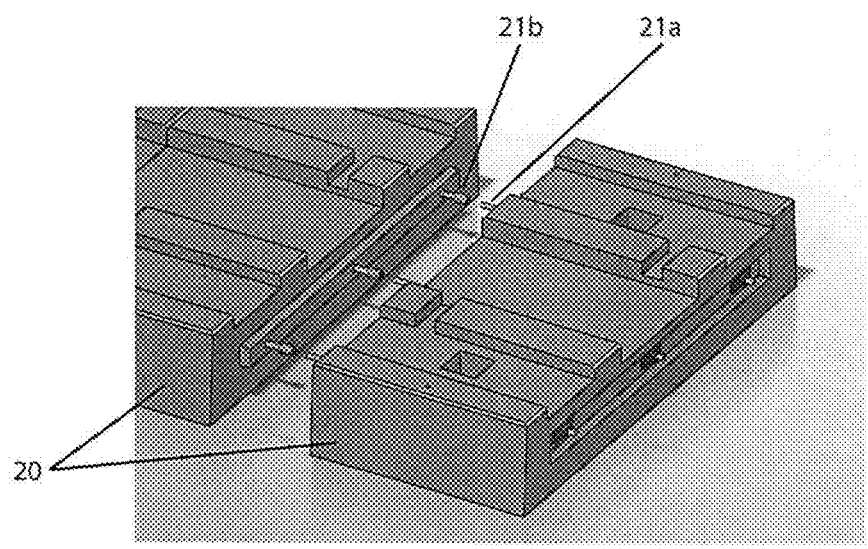
FIG. 3A is an isometric view of a portion of a modular pre-cast base.

Referring now to FIG. 3A, a section of a pre-cast base or pad 20 is shown according to an exemplary embodiment, which provides a mounting and support surface for the power modules 12 and input/output module(s) 14 of the fuel cell system of FIG. 1. In one embodiment, two or more such pre-cast sections are joined to form the base 20 that supports the modules 12 and 14 of the full system. By providing the pre-cast base 20 in sections, the overall weight of the structures to be transported, manipulated, and installed is reduced. The base 20 is preferably made of concrete or similar material, such as a geopolymer based composition. Alternatively, the base 20 may be made of any other suitable structural material, such as steel or another metal. The base 20 may be made by casting the base material into a patterned mold, removing the cast base 20 from the mold and then transporting the pre-cast base 20 from the location of the mold (e.g., in a base fabrication facility) to the location of the fuel cell system (i.e., where the fuel cell system will be located to generate power). The step of transporting may comprise transporting the base sections a distance away from the factory, such as at least one kilometer.

FIG. 3B illustrates the pre-cast sections 20 of the modular base. Alignment and assembly of the pre-cast sections 20 may be performed, for example, with mating male 21a and female 21b pins. Other methods may also be used, such as jigsaw patterns on the edges of the pre-cast sections or with a system of protrusion and slots. In this manner, a base suitable for a large number of power modules 12 may be easily fabricated from a plurality of smaller pre-cast sections 20. For example, a single base may be designed to support two power modules 12. These pre-cast sections 20 may be easily cast and transported. The pre-cast sections 20 may be assembled on site to create a base suitable for a power system having 4, 6, 8, 12 or more power modules 12.

Existing fuel cell systems may connect various modules with electrical wires that are run through rubber seal panels that keep the rain out. The hot gasses (e.g., fuel and air inlet and outlet streams) are provided to and from the fuel cell stacks through conduits, such as pipes and manifolds.

According to an exemplary embodiment, the pre-cast base 20 is formed to include channels (e.g. trenches, depressions, slots, etc.) to receive electrical bus bar conduits 24, input and output fuel conduits 27 and water conduit(s) 28 to and from the system and/or between the modules. A first channel 22 houses the electrical bus bar 24, which provides bus connections to the power modules 12 and input/output module(s) 14. As shown in the Figures, the bus bar 24 may be a laminated bus bar with a segmented design or a section of a cable. A second channel 26 houses the header for fuel supply conduit 27 and the header for the water supply conduit 28. Quick connects/disconnects couple the conduits 27 and 28 to the fuel and water inlets in each module 12 and 14, as described for example in U.S. application Ser. No. 12/458,355, filed on Jul. 8, 2009 and incorporated herein by reference in its entirety. By providing the bus bar conduits 24 and fluid conduits 27, 28 in channels in the pre-cast base 20, the fuel cell modules 12 and/or 14 themselves protect the bus or header connections from the elements. Additional channels may be formed in the base 20 to house other components, such as communication lines, or to provide water drainage features to ensure water is directed as desired for good system integration. Further, the first and second channels 22, 26 and other features of the pre-cast base 20 may be formed in a mirrored configuration. In this manner, the system can be assembled with plural power modules 12 in a mirrored configuration, simplifying assembly and maintenance.

The precast base 20 may include beveled structures to allow the fuel cell modules 12 and 14 to self-align to the pre-cast base 20 and plumbing and wiring structures (e.g. quick connects/disconnects for the conduits 24, 27 and 28). According to one exemplary embodiment, the self-alignment feature may comprise an angled latch mechanism as described in U.S. application Ser. No. 12/458,355, filed on Jul. 8, 2009 and incorporated herein by reference in its entirety. In another exemplary embodiment, the self alignment feature may comprise a cone mounted or integrally formed with the pre-cast base 20, similar to the features described in U.S. application Ser. No. 12/458,355. The cone is configured to be received in a corresponding indentation on the base of the fuel cell system modules 12 and 14 which to ensure proper alignment as the modules 12 and 14 are lowered to the base.

Unlike concrete bases that are poured on-site, a pre-cast base 20 can include all features necessary for the site installation. The design for the pre-cast base 20 can be pre-approved by a civil engineer, significantly reducing review time by local authorities when the base 20 is installed. The pre-cast base 20 simplifies site preparation and installation by eliminating the need for trenching for fuel, water and electricity during site preparation. However, in an alternative embodiment, the base 20 with channels may be poured on the site where the fuel cell system will operate.

Door Materials And Appearance

Because of the significant size of the fuel cell stack hot boxes, large stationary fuel cell system cabinets have large cabinet doors. The doors may be one to three meters tall by one to three meters wide and made of metal, such as steel or aluminum. The large dimensions of the doors result in higher mechanical loading requirements on the cabinet, increased door weight and increased difficulty of handing the doors. Furthermore, the large doors require a large amount of wasted stand off space between each cabinet and an adjacent structure (e.g., building, another cabinet, etc.) to allow the side hinged door to swing open.

A conventional door opening mechanism (such as a left or right-sided hinged mechanism) would leave the opened door in a position that could hinder access to the inside of the cabinet, especially in a narrow space, such as an alley, or leave the door in a position that could expose it to damage from other doors or equipment. Furthermore, hinging a door from the side could contribute to door-sag from its own weight and dimensions. An additional issue faced when designing a fuel cell cabinet for outdoor operation is the integrity of the weather seal at each door interface. The seal must be positively assured in order to eliminate the reliability impact of water and foreign material entry to the cabinet.

Furthermore, the doors may be constructed from many parts due to the multiple functions that a door performs, such as protecting the fuel cell hot box from the environment, providing a thermal barrier between the outside of the hot box and the ambient, housing the air filters, providing mounting locations for latches, hinges, and seals, etc. The large amount of parts may impact the quality and placement accuracy of the door.

Figure 4:
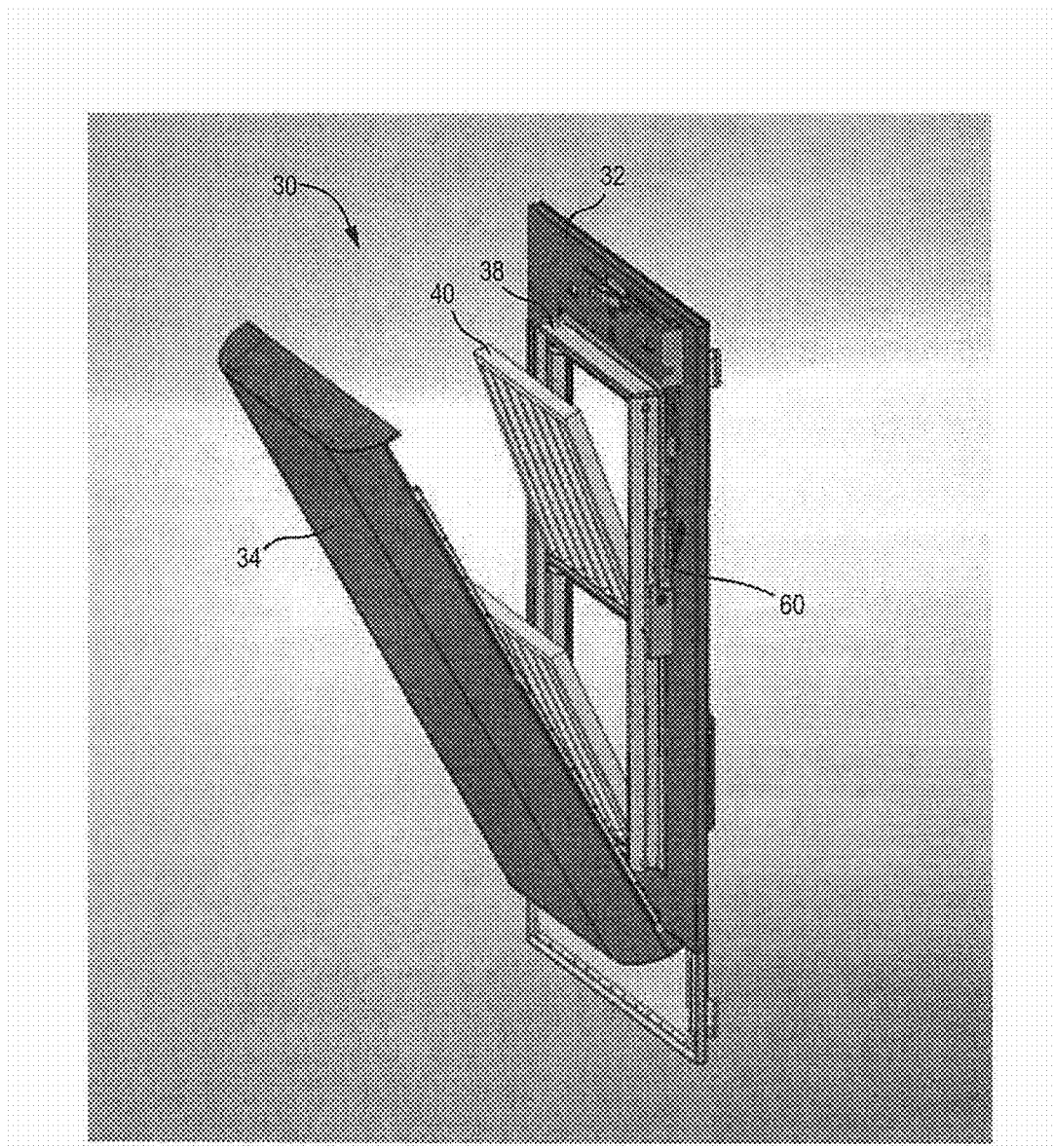
FIG. 4 is an isometric view of a door for the module of FIG. 2 in a first open configuration according to an exemplary embodiment.

Referring now to FIG. 4, each of the power modules 12 and input/output modules 14 include a door 30 (e.g., hatch, access panel, etc.) to allow the internal components of the module to be accessed (e.g., for maintenance, repair, replacement, etc.). According to an exemplary embodiment, the modules 12 and 14 are arranged in a linear array that has doors 30 only on one face of each cabinet, allowing a continuous row of systems to be installed abutted against each other at the ends. Thus, the cabinets have doors facing perpendicular to an axis of the module row. In this way, the size and capacity of the fuel cell enclosure 10 can be adjusted with additional modules 12 or 14 and bases 20 with minimal rearranging needed for existing modules 12 and 14 and bases 20. If desired, the door to module 14 may be on the side rather than on the front of the cabinet.

According to an exemplary embodiment, the access doors 30 for the modules 12 and 14 are formed of at least one inner portion 32 and at least one outer portion 34. The inner portion 32 forms a framework for the door 30 and includes features to allow the door 30 to be coupled to the module 12 or 14. The outer portion 34 is coupled to the inner portion 32 and provides an outer fascia for the door 30. In a preferred embodiment, the outer portion 34 is formed of a polymeric material and the inner portion 32 is formed of a metal material.

By forming the outer portion 34 of the door 30 at least partially with polymeric components, the building and painting costs, overall weight, and exterior heat loading can be reduced and the dent resistance of the door 30 can be increased. Flame resistance per UL 746C can be included for the material of the outer portion 34 when needed for specific applications.

In one exemplary embodiment, the entire door 30 is injection molded as a single structure. The injection molded door 30 incorporates as many features as possible to reduce total part count, provide mounting points, and simplify production of high quality parts. The mold for such a molded door can be configured to allow two different plastics to be co-injected into the same mold, such that the inner side of the door (i.e., the side which faces into the cabinet when closed) is made from a heat and flame resistant plastic sheet, while the outer side of the door is made from a plastic sheet that is weather resistant and aesthetically pleasing without possessing the flame and high temperature resistance. An air filter may be located between the inner and outer portions of the door.

According to another exemplary embodiment, the door 30 is formed with a vacuum thermoforming process. A sheet can first be formed with co-extrusion of two or more plastics that meet UL and cosmetic requirements. The co-extruded sheet can then be vacuum thermoformed to form the door 30.

Because high temperature fuel cells (e.g. SOFCs) operate at high temperatures, door 30 may be formed to have materials or features to increase the flame resistance of the door 30. If there is no risk of flame or extreme heat exposure, then a standard, low cost, color plastic material can be used to form the door 30. If there is a low risk of flame, additives can be mixed with the standard plastic while maintaining exterior quality of the door 30. For example, co-injection can be used to mold the exterior (e.g., the outer portion 34) using the standard plastic and the interior (e.g., the inner portion 32) using the required UL746C flame resistant plastic. A single, co-injection mold with inserts to allow for needed features can be used to form the door. According to other exemplary embodiments, when flame resistance is needed per UL746C, the door 30 may feature another type of flame retardant feature on its surface (e.g., a flame retardant coating added to the inner surface of the door 30; a separate, flexible flame retardant layer such as cloth is provided over the inner surface of the door; a separate, rigid flame retardant layer such as an extruded flat plastic; etc.).

The polymer outer portion 34 can be molded or otherwise formed in a variety of colors, eliminating the need for paint. The polymer outer portion 34 may be dent resistant and graffiti resistant. The polymer outer portion 34 may be scratch resistant and any scratches that do occur will be less visible than similar scratches on a metal body and will not cause associated corrosion problems. Further, the outer portion 34 can include additional parts and features that are integrally molded, such as molded in filter housings, and inserted fasteners to promote easier, faster, more accurate assembly of the door 30 and installation of the doors 30 on the modules 12 and 14.

Figure 2:
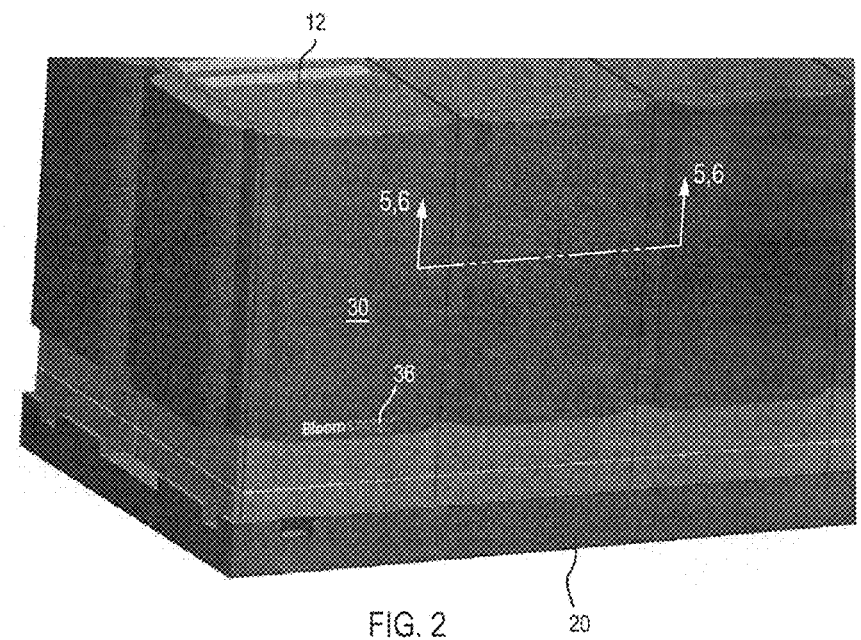
FIG. 2 is an isometric view of a module of the fuel cell system enclosure of FIG. 1 according to an exemplary embodiment.

A logo 36 (FIG. 2) may be affixed to or formed during molding of one or more of the doors 30 of the fuel cell system enclosure 10. This logo 36 may be lighted (e.g., by including a backlight behind the logo) to highlight the operating status of the unit. The logo 36 can be affixed to the door 30 in a manner as to allow the logo 36 to be backlit (e.g., over an opening in the outer portion 34 of the door 30 containing an LED or another backlight) when the particular unit or module is operating.

A polymer outer portion 34 can reduce costs by reducing manual labor and material needed for construction of the door 30. Forming the outer portion 34 with a process such as injection molding allows for highly repeatability for better fit and easier assembly of the door 30. A polymer material is lighter than a corresponding part formed of a metal material allowing for easier handling, lifting, and reduced shipping costs.

Filter Assembly

Fuel system cabinets generally include filtration systems to filter incoming cooling air that passes through the cabinet. In high-dust environments, multi-layered filters can quickly become clogged and require frequent changes. Pneumatic back flush filters only work when the air intake is shut down and generally do not work well constant run, always-on fuel cell systems. Water curtain filters, in which a curtain of falling water removes particles form air passing through the water, requires power and water flow, which complicates the operation of the system. Such systems require a water filter for a closed system or a constant water supply for open systems.

The door 30 may include one or more air filters 40 as shown in FIG. 4. For example, two standard filters 40 may be located over each other in a space between the inner 32 and outer 34 door 30 portions.

Figure 5:
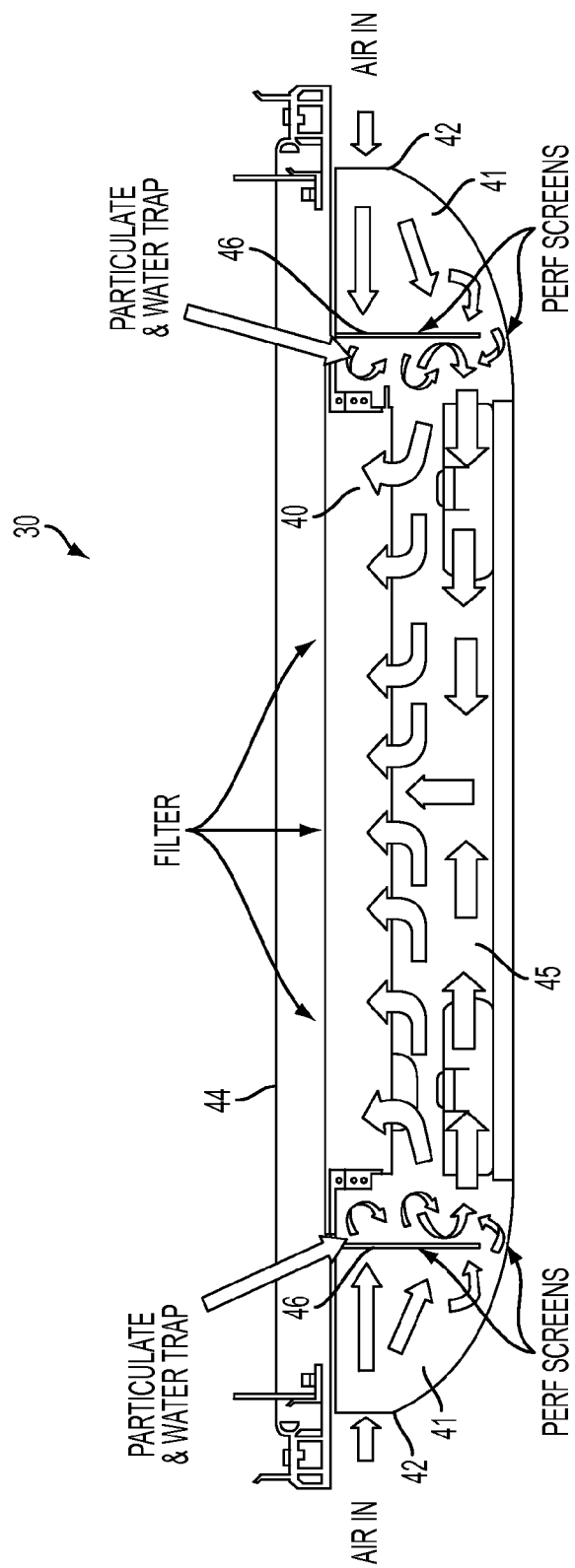
FIG. 5 is a cross-section view of a door for the module of FIG. 2 taken along line 5-5 showing an airflow through the door according to one exemplary embodiment.

As shown in FIG. 5, the left and/or right edge of the door 30 includes an opening (e.g., vertical intake louver or inlet) 42 to the space between the inner 32 and outer 34 door portions where the filters 40 are located. The opening 42 acts as an air inlet into the cabinet of the power module 12. The air passes through the filters 40 to filter foreign material (e.g., dust, dirt, etc.) from the incoming air. The filtered air is then provided to the inside of the cabinet through an outlet 44 in the inner portion 32 of the door 30. Thus, the air filters 40 are provided between the inlets(s) 42 and the outlet 44. The filtered air acts as the inlet air stream which is blown into the fuel cell stacks located in the hot box by an air blower located in the cabinet.

The door may further include a rough or initial filtering mechanism, such as one or more perforated screens 46, as shown in FIG. 5. The screen(s) 46 are located in the air flow path between the air inlet 42 and the filter(s) 40. Each screen 46 may have an "L" shape when viewed from the top of the door. By pre-filtering the incoming air, the door 30 reduces the amount of dust and other particulates fouling the air filters 40.

Additional, optional, non-limiting features of the air filtration system of a door 30 are shown in FIG. 5 according to one exemplary embodiment. FIG. 5 is a top view of the door 30 along line 5-5 in FIG. 2.

Air (shown by arrows in FIG. 5) enters from one or more door sides (e.g., left and/or right edge surfaces of the door) through the inlets 42 and immediately enters a larger volume 41 located between the inlets and the screen 46. In other words, the width of the volume 41 is larger than that of the adjacent inlet 42. This allows the air to expand and slow in the volume 41. As the air slows, dirt, dust and other particulate matter suspended in air is allowed to drop down to the bottom of the volume 41 prior to reaching the perforated side screens 46. The air then passes through the side perforated screens 46 and enters an inner cavity 45 between door portions 32 and 34 where the air turns about 90 degrees as shown by the arrows in FIG. 5 to move to the plenum in front of the air filter 40. The screens 46 also create turbulence in the air flow. When the air flow becomes more turbulent and turns abruptly, entrained and suspended particulates that passed through the perforated screens 46 are caused further to drop out of the air. Air with reduced foreign material then passes through air filter 40. The filter assembly 40 creates an inner vertical baffle. The air filter 40 provides final filtration, and filtered air enters the cabinet through the outlet 44 in the inner portion of the door.

The outer portion 34 of the door 30 is configured to be hinged outward relative to the inner door 32 (see FIG. 4) to aid in rapid and easy servicing of the door filters 40. The hinge may be on the bottom of the door 30 such that the outer portion 34 of the door 30 swings downward to expose the filters 40 for maintenance without opening the inner portion 32 of the door 30 to the inside of the module 12 or 14. Thus, the filters may be serviced or replaced without opening the entire door 30 to the cabinet of a module 12.

One or more frame members 38 holding the filters 40 can be configured to pivot outward or to allow only the filters 40 to pivot outward as shown in FIG. 4. The frame member 38 and/or filters 40 may be configured to pivot outward using a pivot point on the bottom end thereof. The member 38 and/or filters 40 may be configured to automatically pivot outward when the outer portion 34 of the door 30 is pivoted outward. Alternatively, the member 38 and/or filters 40 may be pivoted outward manually by the operator after the outer portion 34 of the door is pivoted outward. The changing of the door filters 40 is performed without breaking the water-tight seal of the inner portion 32 of the door assembly 30. Thus, the outer door portion 34 is tilted away, the filters 40 are lifted out and replaced, and the outer portion 34 is closed by being swung upwards to be latched to the inner portion of the door 32, as shown in FIG. 4.

The shape of the door inlet 42 is preferably such that the air inlet area is not directly visible from the front of the door and the front of the module, thereby improving the aesthetic of the appearance of the fuel cell system. At the same time, since the inlet 42 extends along the full vertical left and right edges of the door 30, inlet pressure drop is diminished, reducing the parasitic power draw of the system. Further, since the air inlets 42 may be located on both the left and right sides of the door 30, if there is a systematic bias in environmental foreign material (such as may occur with snow or sand drifts or other windblown debris), one of the two sides will effectively be in the "lee" (i.e., downstream) of the oncoming wind, and thereby be significantly more free of foreign material allowing the unit to operate without obstruction even in severe storm conditions.

The configuration of the door 30 as shown in FIG. 5 has several non-limiting advantages. The air passing through the door 30 is significantly cleaner before it even first enters the filters 40 than prior art doors. No direct power is consumed to perform the first-stage foreign material removal, achieved by the passive filtering of the air as described above. By reducing the amount of foreign material that reaches the filters 40, the frequency with which the filters 40 must be changed is reduced. By extending the life of the filters 40, secondary costs due to service personnel visits and filter consumables are considerably reduced for the fuel cell system.

Intake Louver

Figure 6:
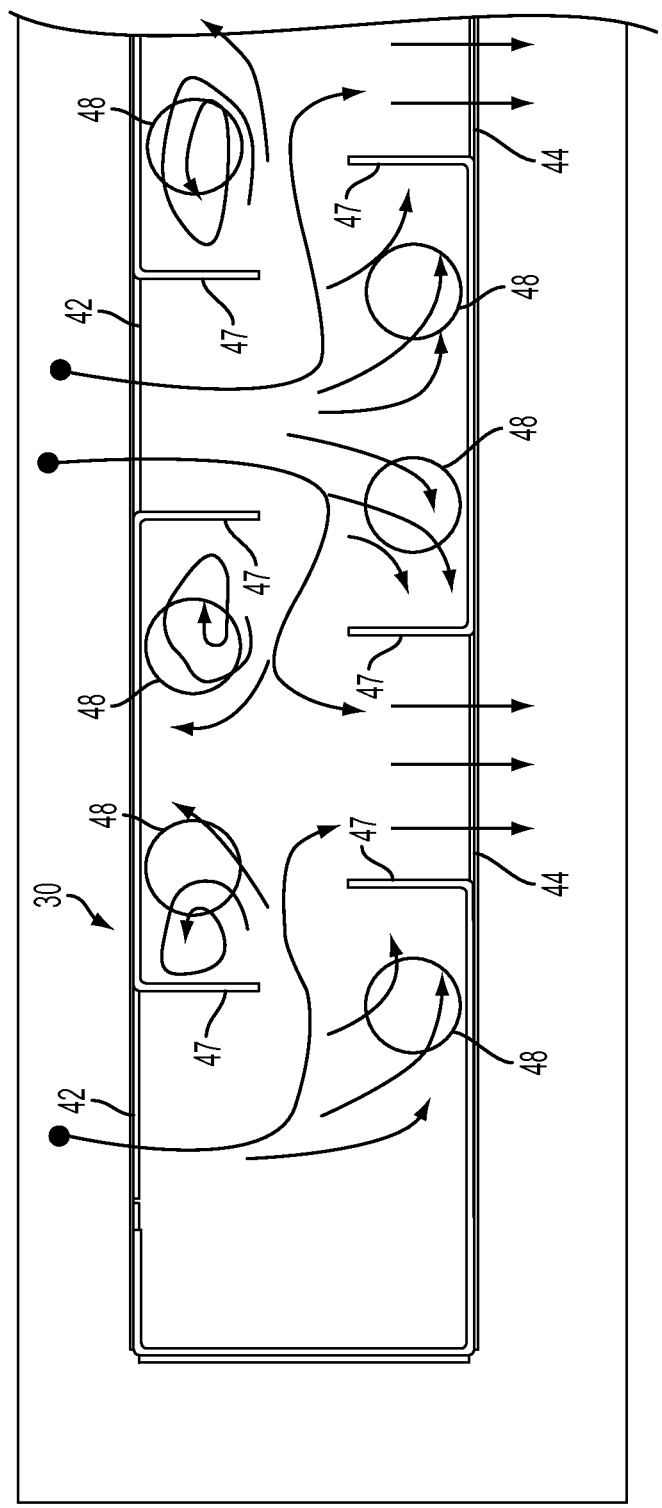
FIG. 6 is a cross-section view of a door for the module of FIG. 2 taken along line 6-6 showing an airflow through the door according to another exemplary embodiment.

Referring now to FIG. 6, a door 30 containing a passive air intake louver is shown according to an alternative embodiment. The intake louver contains a plurality of internal baffles 47 which force the air intake provided from the inlet(s) 42 to change direction at least 2 times inside the door 30 before reaching the outlet 44. The internal baffles 47 may be formed, for example, simply with offset opposing rows of c-channels coupled to the inside of the door 30.

The baffles 47 may comprise strips or rails which are alternatively attached to the inner 32 and outer 34 portions of the door 30, in a roughly interdigitated arrangement (e.g., with baffles attached to opposite portions 32, 34 of the door overlapping or not overlapping in the door thickness direction from outer portion 34 to inner portion 32). The baffles 47 may extend the entire or just a part of the vertical height of the door 30. In general, the baffles 47 may be arranged in any suitable configuration which prevents the air inlet stream from travelling in a straight line from inlet 42 to outlet 44 and forces the air inlet stream to travel a serpentine path from inlet 42 to outlet 44.

The foreign material (dust, sand, mist, etc.) in the air stream has momentum which causes it to continue moving forward while the air changes direction around the baffles 47. The dust and sand collects in the corners (e.g., at the upstream baffle surface) formed by the baffles 47 and drains out of the door through openings 48 in the bottom of the door 30. Air with significant reductions of dust and dirt exits the louver assembly through outlet 44.

The intake louver of FIG. 6 may be used together with the screen 46 and/or expansion chamber 41 and/or filter(s) 40 shown in FIG. 5. In this case, the air first passes from inlet 42 through expansion chamber 41 and/or screen 46 before reaching the baffles 47 of the louver. The air then passes from the louver filter(s) 40, as shown in FIGS. 4 and 5 and into the module 12 or 14 through an outlet 44 in the door. Alternatively, the intake louver may be present in a door which lacks one, two or all of the screen 46 and/or expansion chamber 41 and/or filter(s) 40 shown in FIG. 5.

FIG. 6 depicts two sets of louver structures with air entering from two inlets 42 on left and right sides of the door 30. However, more than two sets of louver structures may be provided in the door 30 at periodic intervals and more than two inlets 42 may be provided. Furthermore, while the inlets 42 are shown in the front portion 34 of the door 30 in FIG. 6, the inlets 42 may be located in the side (i.e., edge) of the door 30 as shown in FIG. 5 in addition to or instead of in the front of the door.

Door Assembly

As noted above, because of the significant size of the fuel cell stack hot boxes, large stationary fuel cell system cabinets have large cabinet doors. The large dimensions of the doors result in higher mechanical loading requirements on the cabinet, increased door weight and increased difficulty of handing the doors. Furthermore, the large doors require a large amount of wasted stand off space between each cabinet and an adjacent structure (e.g., building, another cabinet, etc.) to allow the side hinged door to swing open.

Conventional door opening mechanisms have left or right-sided hinges. These open in a sideways direction pivoting on a hinge which would pivot from a side edge. This conventional door opening mechanism leave the opened door in a position that could hinder access to the inside of the cabinet, especially in a narrow space, such as an alley, or leave the door in a position that could expose it to damage from other doors or equipment. Furthermore, hinging a door from the side could contribute to door-sag from its own weight and dimensions. An additional issue faced when designing a fuel cell cabinet for outdoor operation is the integrity of the weather seal at each door interface. The seal must be positively assured in order to eliminate the reliability impact of water and foreign material entry to the cabinet.

Figure 7:
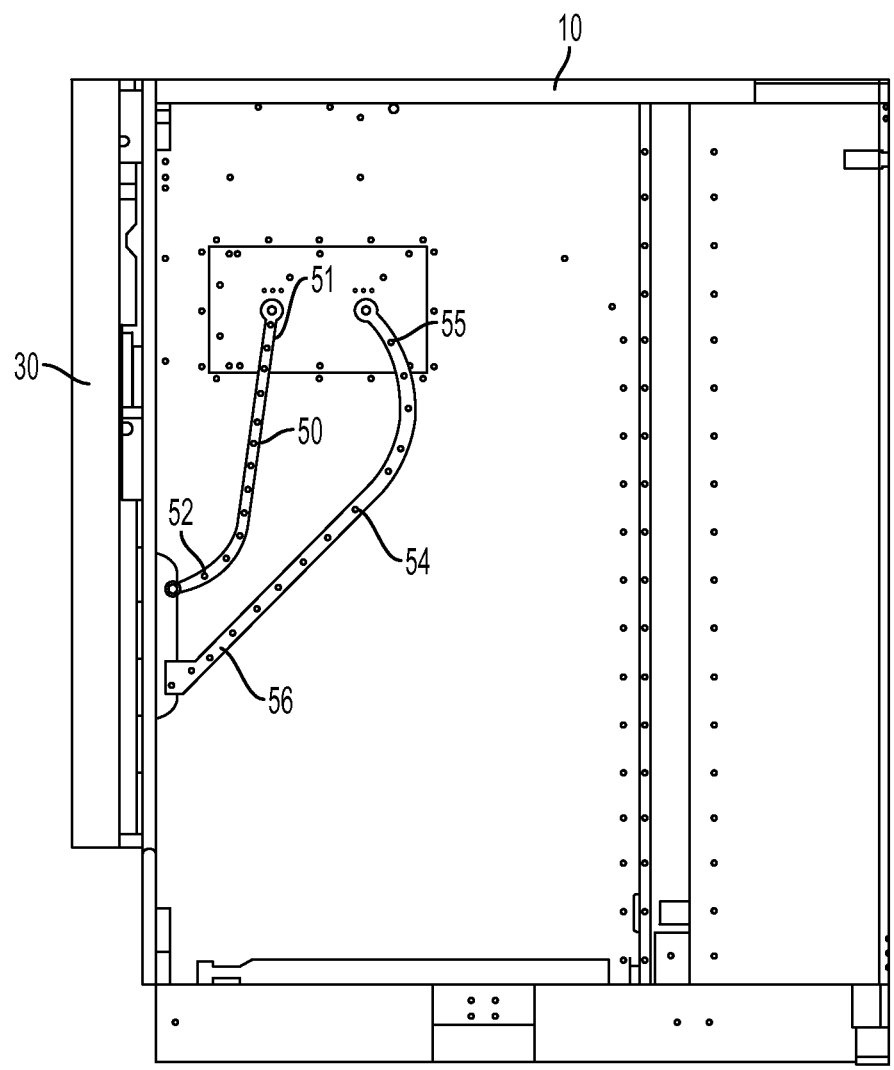
FIG. 7 is a side view of the module of FIG. 2 with the side wall removed, showing the door in a closed position according to an exemplary embodiment.
Figure 8:
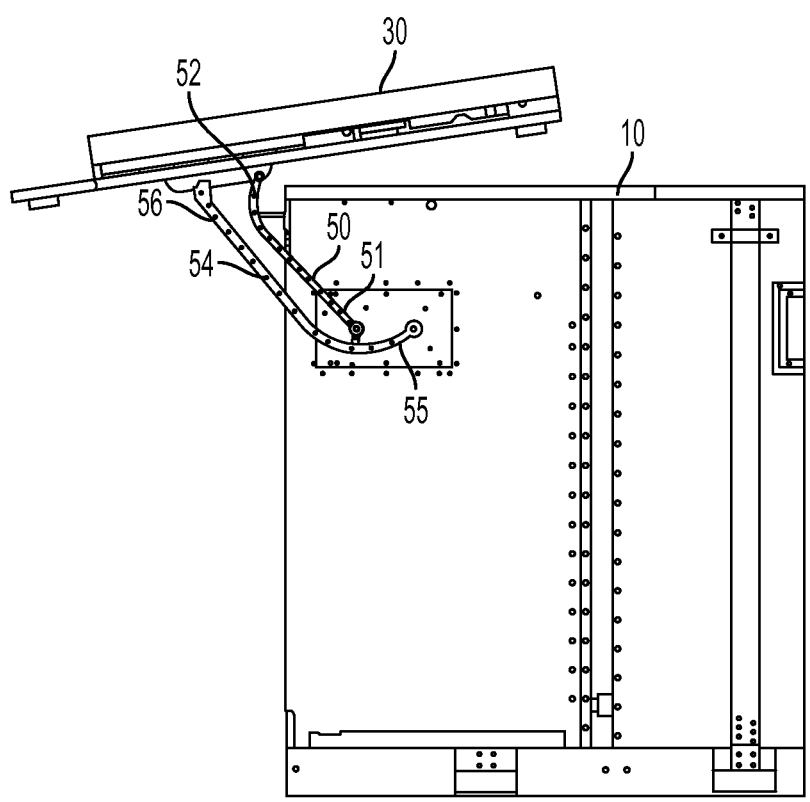
FIG. 8 is a side view of the module of FIG. 2 with the side wall removed, showing the door in an open position according to an exemplary embodiment.
Figure 9:
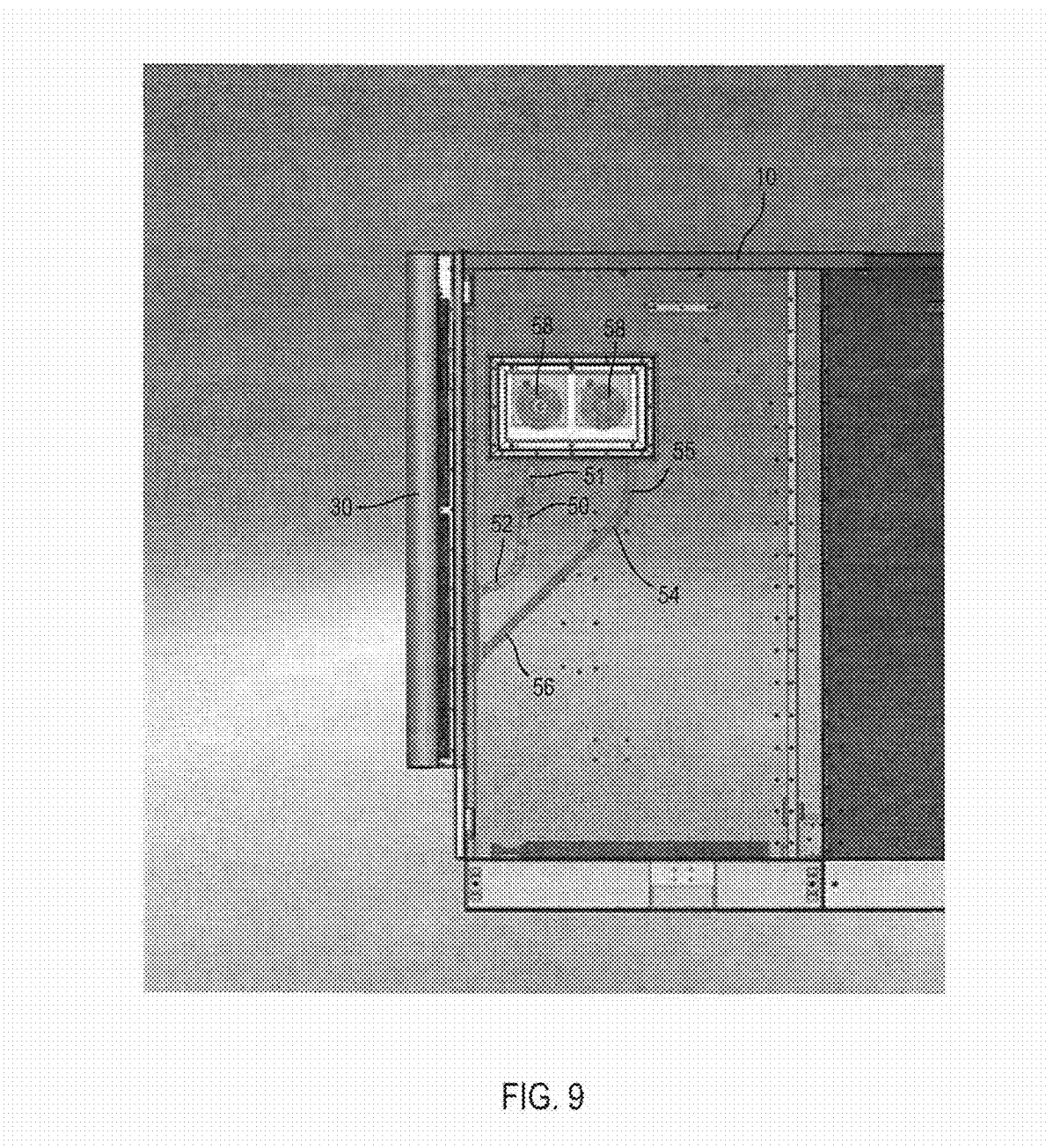
FIG. 9 is a side view of the module of FIG. 2 with the side wall removed, showing the door in a closed position with springs to bias the door in the closed position according to an exemplary embodiment.

Referring to FIGS. 7-9, in one embodiment, the entire door 30 (e.g., both the interior portion 32 and the outer portion 34) can be opened to access the interior of the enclosure or cabinet 10 of the module 12 or 14. In order to mitigate the door-sag which might result from the torque upon the door when it is opened, door structures of large stationary generators are generally significantly reinforced with expensive and complex structural members.

Another prior art door panel configuration involves removable cabinet doors. With such designs, when a fuel cell system is being serviced, the door panel is removed and set to the side. In the case of large scale stationary fuel cell generators, removable doors are generally not employed because lifting off a large and heavy door assembly would generally require two field service personnel.

According to an exemplary embodiment, the inner portion 32 and the outer portion 34 of the door 30 open in tandem with a substantially vertical and then substantially horizontal swing (e.g., "gull-wing" style). In other words, the door 30 opens by being moved up and then at least partially over the top of the enclosure 10 in a substantially horizontal direction. The terms substantially vertical and substantially horizontal of this embodiment include a deviation of 0 to 30 degrees, such as 0 to 10 degrees from exact vertical and horizontal directions, respectively.

The door 30 is mounted on to walls of the enclosure or cabinet 10 of the module 12 or 14 with plural independent mechanical arms, such as two arms 50 and two arms 54. FIGS. 7-9 show one arm 50 and one arm 54 on the right side of the cabinet 10. The corresponding arms 50 and 54 on the left side of the cabinet 10 are obscured by the right side arms and thus not visible in the side views of FIGS. 7-9. Thus, in the non-limiting example, two arms 50 and 54 are provided on either side of the door 30 for a total of four arms.

The first arm 50 includes a first, generally straight end 51 and a second, generally curved end 52. The second arm 54 includes a first, generally curved end 55 and a second, generally straight end 56. The second arm 54 is longer than the first arm and has a more pronounced curvature at one end. The ends 51 and 55 are coupled to the interior surface of a wall of the enclosure 10 at a fixed distance relative to each other. The ends 52 and 56 are coupled to the door 30 at a fixed distance relative to each other. End 51 is located closer to the door than end 55. End 52 is located above end 56 on the door.

The angle of attack for the door 30 as it is opening and closing and a change in the vertical position when closed and horizontal position when open can be adjusted by changing the location of the pivot points on the door 30 and on the enclosure 10 or by adjusting the shape and/or length of the arms 50 and 54.

Biasing members 58, such as springs, may be added to assist in opening the door, as shown in FIG. 9. The biasing members 58 are mounted in such a way as to assist in the opening of the door 30 a slight distance when the latch is released (as described below) and continue assisting as the door 30 is fully opened. According to an exemplary embodiment, the biasing members are coil springs. The coil springs are affixed to the enclosure 10 and connect to the arms 50 and 54. The coil springs are set to provide the correct lifting assist at different positions of the door arms 50 and 54.

As shown in FIG. 8, in the open position, the arms 50 and 54 and the biasing members 58 cooperate to hold the door 30 in a generally horizontal orientation above the enclosure 10. The movement of the door 30 between the closed position (FIG. 7) and the open position (FIG. 8) as constrained by the arms 50 and 54 has several advantages over a conventionally side-hinged door. The hinge mechanism includes a relatively low number of parts. Site layout required (e.g., clearance required surrounding the enclosure) with the gull-wing door 30 is smaller than for side-hinged door of the same dimensions because of the shorter path traced by the door 30 as it opens compared to a path traced by a side hinged door. When closing the door 30, the user is aided by gravity to overcome the force of the biasing members 58.

Further, in the open position shown in FIG. 8, the upper portion of the door 30 may be located over the enclosure or cabinet 10 and the lower portion of the door may optionally overhang the opening to the enclosure 10. In this configuration, the door 30 has the advantage of providing rain and snow protection for a user when open since the lower portion of the door overhangs from the fuel cell system enclosure 10. Alternatively, the entire door 30 may be located over the enclosure 10 in the open position.

Door Latch Mechanism

Prior art door latch mechanisms of fuel cell system cabinets often make use of a small compression latch, typically attached directly to a key. In these, when the door is large, significant force must be applied to the door in a "pushing" fashion in order to achieve gasket set and to allow the latch to close.

Figure 10:
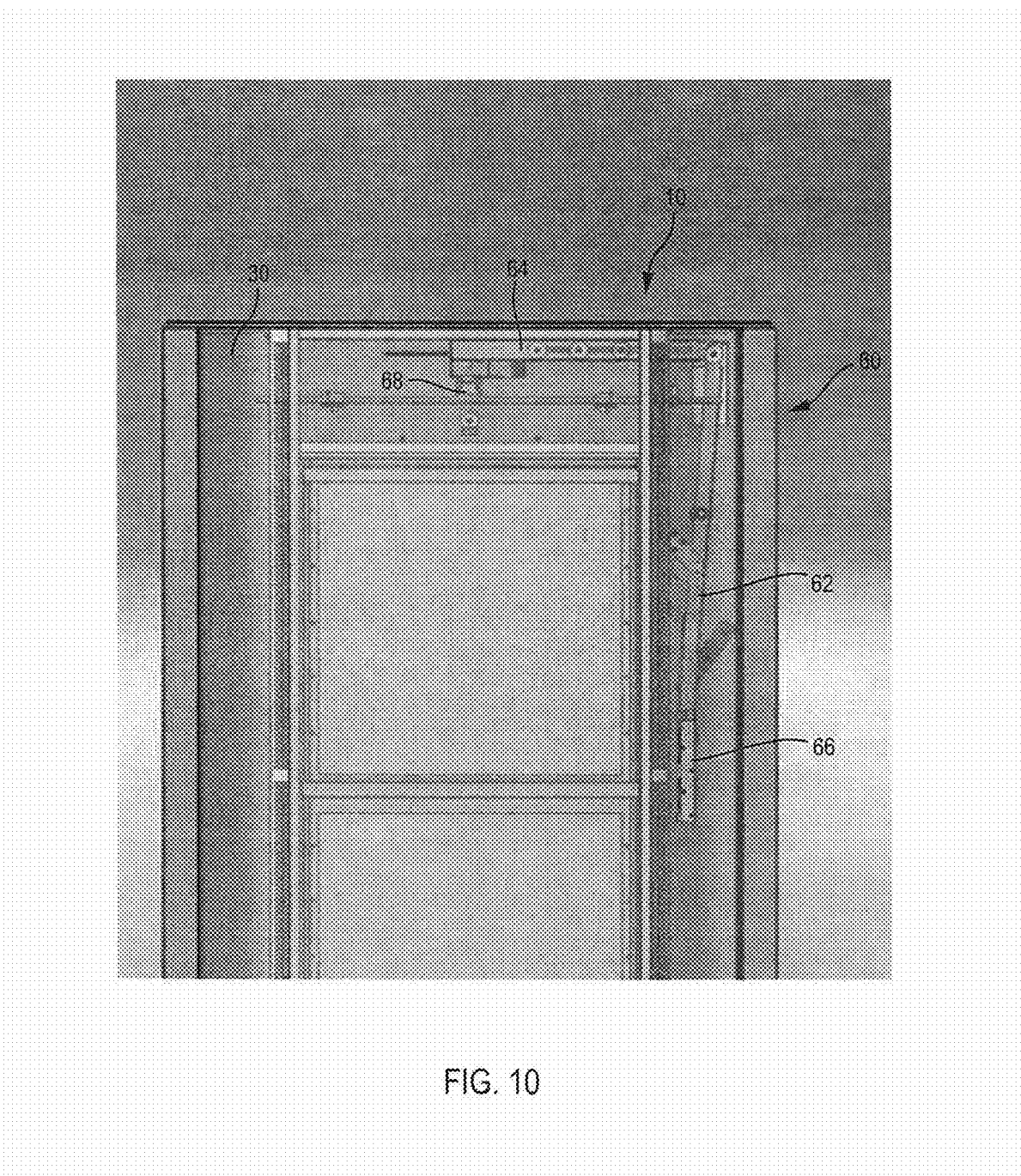
FIG. 10 is a front view of the module of FIG. 2 with the outer door panel removed, showing a latch mechanism in a locked position according to an exemplary embodiment.
Figure 11:
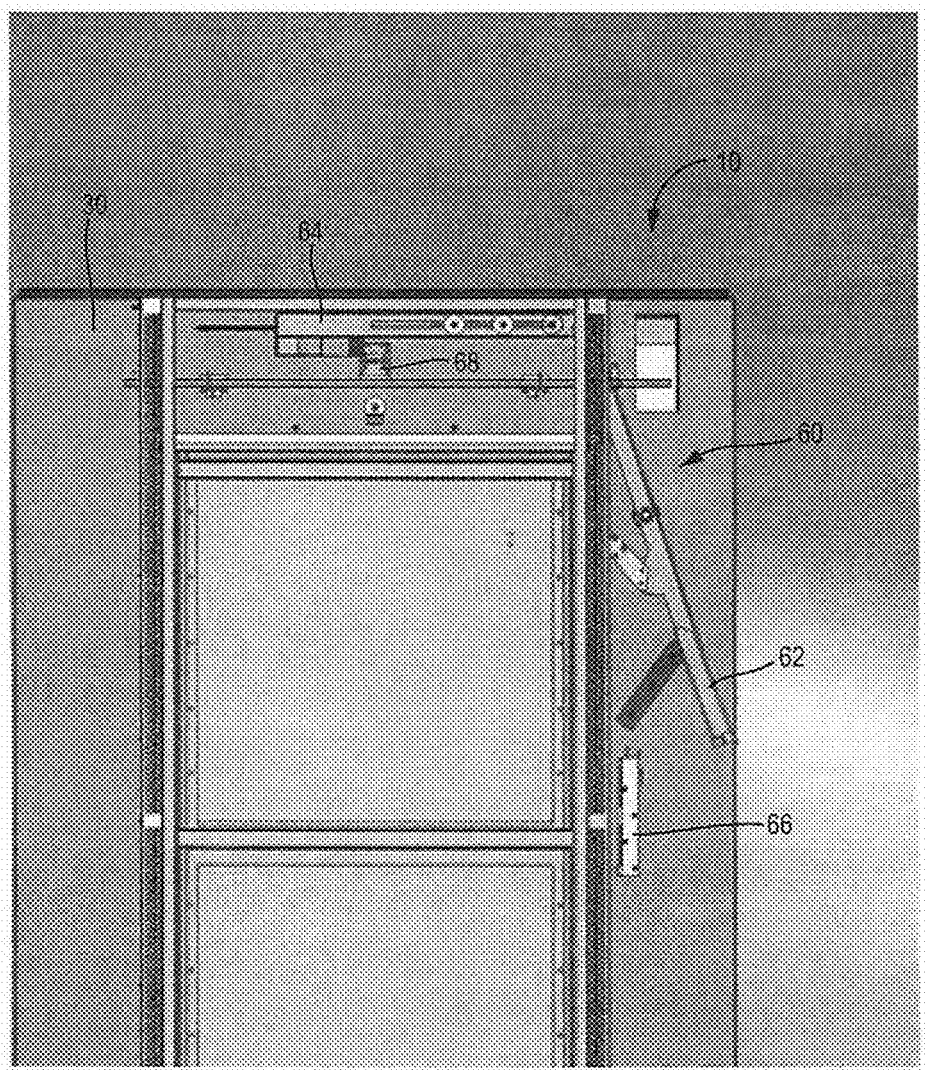
FIG. 11 is a front view of the module of FIG. 2 with the outer door panel removed, showing a latch mechanism in an unlocked position according to an exemplary embodiment.

Referring now to FIGS. 10 and 11, a latch 60 for a door 30 is shown according to an exemplary embodiment. FIG. 10 shows the door 30 in the closed and locked position with the outer door portion 34 made transparent to show the latch 60 mechanism. FIG. 11 shows the door in the closed and unlocked position with the outer door portion 34 not shown to expose the latch mechanism. Preferably, the latch is located inside the door 30 between the inner 32 and outer 34 door portions. The latch 60 for the door 30 includes a side handle 62, one or more biasing members (e.g., springs 58 shown in FIG. 9), a wheeled latch actuating mechanism 64, an optional lock 66, and a catch 68 coupled to the enclosure 10 (e.g., to frame of cabinet 12 or 14). The handle 62 is provided on the side of the door 30 (e.g., on the edge portion of the door 30 between the inner 32 and outer 34 portions of the door, such that the handle 62 is exposed from the side of the cabinet 12, 14). The handle 62 is hinged so that it can be swung out to the side of the module 12 or 14. In other words, the user can swing or rotate the handle 62 in a plane parallel to the front surface of the door (i.e., in a plane which extends between the inner 32 and outer 34 door portions). The handle 62 is directly or indirectly mechanically connected to the mechanism 64 such that movement of the handle in a circular motion in the above described plane causes the mechanism to slide to the side (i.e., left or right) to disengage or engage the catch 68.

To lock the door 30, the door is first swung back down into the closed position, as shown in FIG. 7. The handle 62 is pulled down and to the left (e.g., rotated in a clockwise motion) in a plane parallel to the imaginary plane between the inner and outer door portions, as shown in FIG. 10. As the handle 62 is pulled down and to the left side, causes the wheeled latch actuating mechanism 64 to slide to the right side along the track until the mechanism 64 engages the catch 68. As the latch mechanism 64 engages with the catch 68 which is coupled to the frame of the enclosure 10 (e.g., the frame of cabinet 12 or 14), the door 30 is pulled inward toward the enclosure 10, applying a "set" or fixed amount of compression to the door gasket. The positive "set" on the gasket materials once the latch 60 is engaged helps the door seal to be weather tight so that it may prevent entry of water (e.g., rain or snow) or other foreign material into the enclosure 10. The latch 60 may also include a lock mechanism 66 which allows the door 30 to be locked shut by the user using a key or other implement. To unlock the door 30, the user first unlocks the lock 66 with a key. The user then rotates the handle counterclockwise (i.e., up and to the right) in the plane parallel to the imaginary plane between the inner and outer door portions, as shown in FIG. 11. As the handle 62 is pulled up and to the right side, causes the wheeled latch actuating mechanism 64 to slide to the left side along the track until the mechanism 64 disengages from the catch 68. Once the mechanism 64 is disengaged from the catch 68, the door 30 is unlocked and can be swung up into the open position, as shown in FIG. 8. While the latch has been illustrated with movement in the left, right, clockwise and counterclockwise directions, this should not be considered limiting on the scope of the invention. Any other suitable movement directions can also be used. For example, for the handle 62 located on the left side of the door, the above directions are reversed.

In another exemplary embodiment, the latch 60 may include an electrical actuator to release the latch to allow the door to open. The electrical actuator can be configured to allow either remote control opening of the door 30 (by the remote monitoring command center), or opening of the door 30 by an encoded signal from a hand-carried device such as an electronic key carried by a field service engineer.

Positioning Hot Box In Power Module

The internal components of the power module 12 may need to be periodically removed, such as to be serviced, repaired or replaced. Conventionally, the components, such as the hot box or the balance of plant components are removed from the power module 12 with a forklift. While conventional fuel cell assemblies may require substantial space on all sides to position a forklift and remove the components from an enclosure, sometimes as much as four to five times the length of the hot box.

Figure 12:
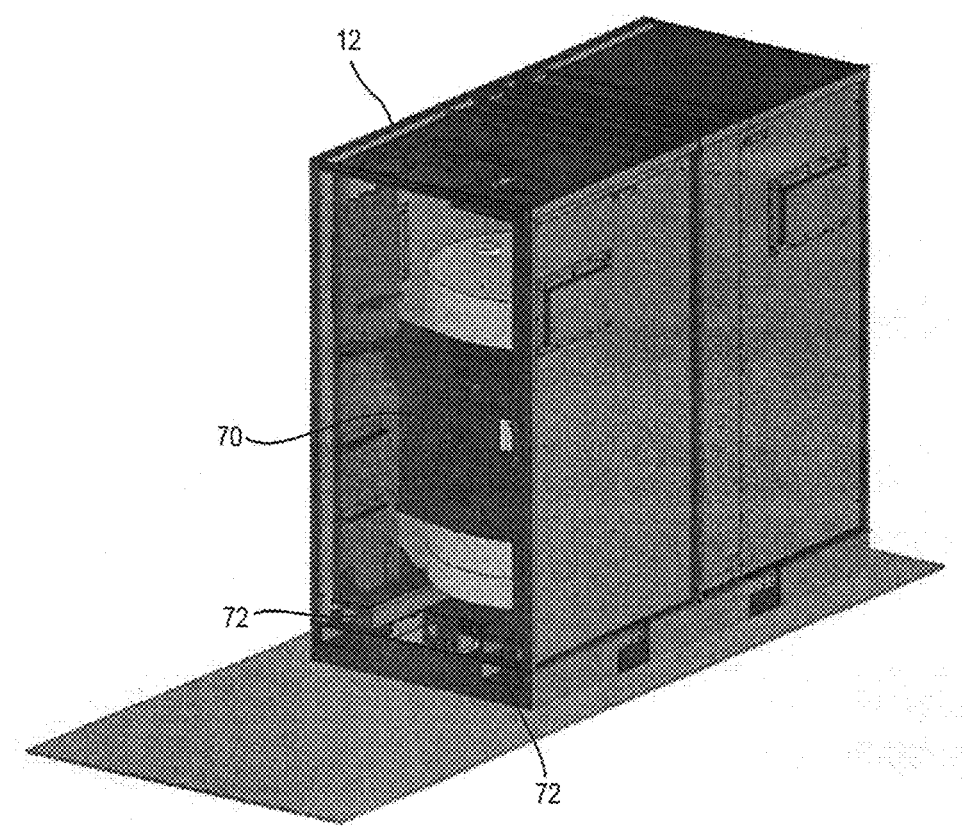
FIG. 12 is an isometric view showing a location of a hot box inside the module enclosure with the enclosure door removed.

As shown in FIG. 12, a field replaceable fuel cell module (FCM) 70 includes the hot box sub-system 13, such as the cylindrical hot box (see also FIG. 1) which contains the fuel cell stacks and heat exchanger assembly, as well as a balance of plant (BOP) sub-system including blowers, valves, and control boards, etc. The FCM 70 is mounted on a removable support 72 which allows the FCM 70 to be removed from the power module 12 cabinet as a single unit. FIG. 12 shows a non-limiting example of a FCM 70 configuration where the FCM 70 includes a cylindrical hot box 13 and a frame which supports the BOP components. The hot box and the frame are mounted on common support, such as fork-lift rails 72. Other configurations may also be used. For example, the hot box 13 may have a shape other than cylindrical, such as polygonal, etc. The support 72 may comprise a platform rather than rails. The frame may have a different configuration or it may be omitted entirely with the BOP components mounted onto the hotbox 13 and/or the support 72 instead. The FCM 70 is dimensionally smaller than the opening in the power module 12 (e.g., the opening closed by the door 30). According to an exemplary embodiment, the FCM 70 is installed or removed from the power module 12 cabinet as a single assembly. The FCM 70 is coupled to the other components of the enclosure 10 using a minimal number of quick connect/disconnect connections (e.g., to connect to the water conduits 28, fuel conduits 27, and bus bar conduits 24 housed in the base 20) in order to ensure rapid servicing time, as described in the prior embodiments.

Referring to FIGS. 13-16, a process for removing an FCM 70 from a power module 12 cabinet is shown according to an exemplary embodiment. The FCM 70 and power module 12 are configured to allow the FCM 70 to be easily removed with a minimal amount of space around the power module 12 needed. In this way, the enclosure 10 can require a much reduced footprint relative to existing systems.

Figure 13:
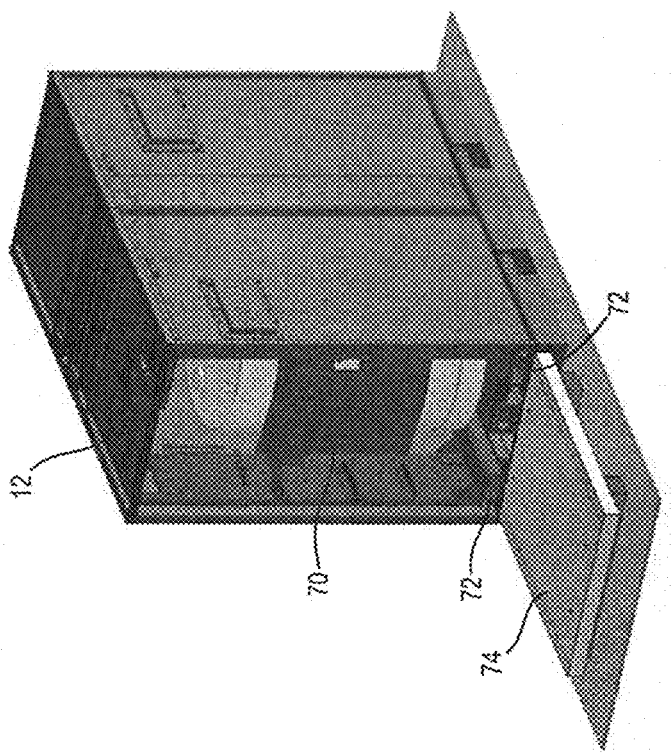

As shown in FIG. 13, a pallet 74 is placed next to an open power module 12. The pallet 74 may be a simple metal pallet which allows mechanically lifting the FCM 70 with attachment to the pallet 74. In other embodiments, the pallet 74 may include a lead-screw type structure for positively pulling the FCM 70 from the power module 12 cabinet.

Figure 14:
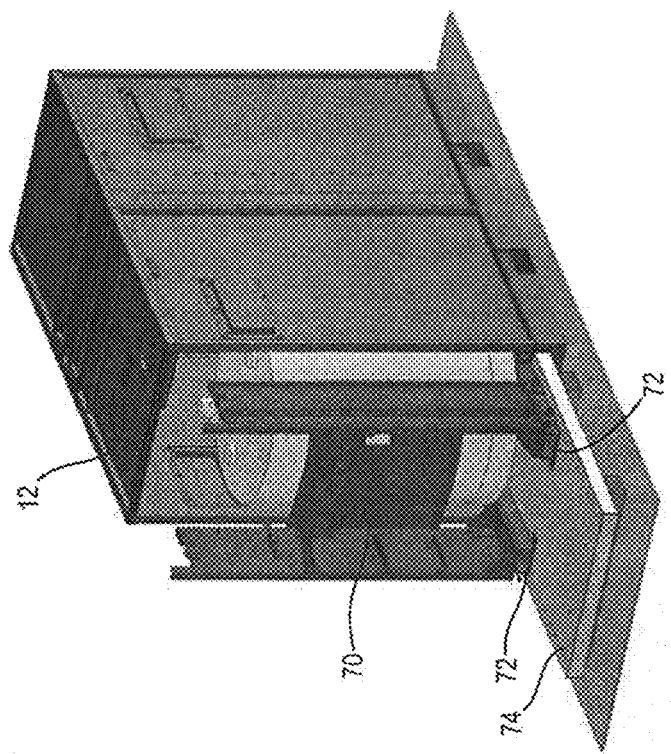
FIGS. 13-16 are isometric views of the module of FIG. 12 showing the hot box being removed from the enclosure onto a pallet according to an exemplary embodiment.

As shown in FIG. 14, with the pallet 74 in place, the FCM 70 is removed from the interior of the power module 12. In one embodiment, rollers are deployed from the FCM 70 and the FCM 70 rolls on guide rails out of the power module 12. The FCM 70 may slide or roll on rollers which are fixed to the FCM 70 or roll on rollers which are fixed to the frame of the power module 12. In another embodiment, the FCM 70 slides out of the power module 12 using a lead-screw type structure. The motor structure for the lead-screw for moving the FCM 70 in or out of the power module 12 may be mounted either on the FCM 70 or on the power module 12 cabinet. In still another embodiment, the FCM 70 may slide on air cushion similar to a device used to move sensitive semiconductor tooling (e.g., a hover-craft like device).

Figure 16:
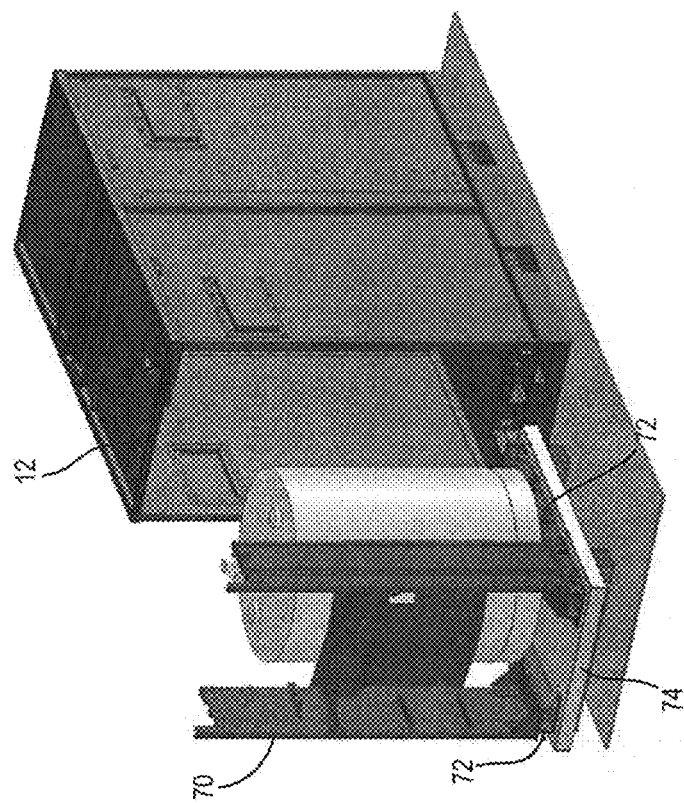
Figure 15:
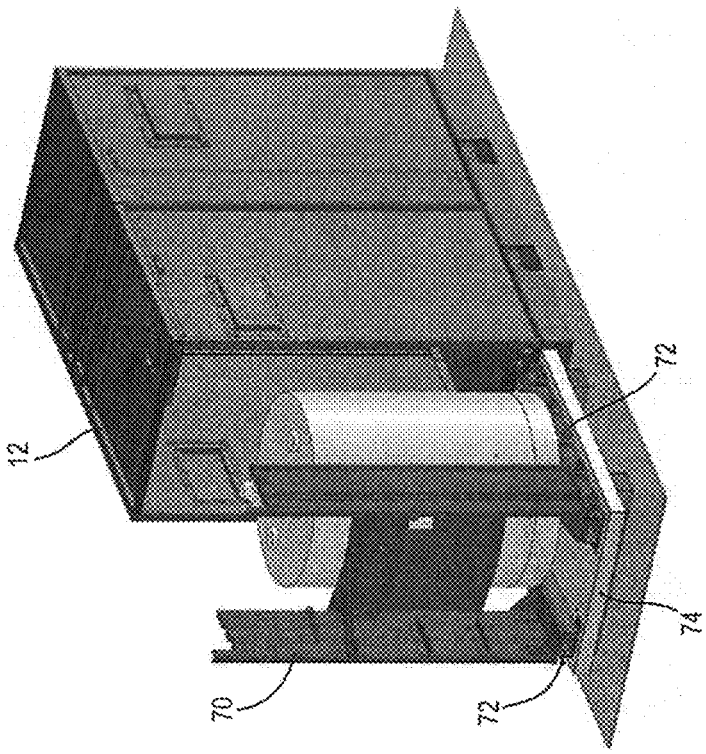

As shown in FIGS. 15 and 16, once the FCM 70 is clear of the power module 12 cabinet, it can be lifted and moved away from the power module 12. The rails 72 are perpendicular to lift rails of the pallet 74, allowing the FCM 70 to be lifted by a forklift from either the side using the pallet 74 in a direction perpendicular to the extension direction in which FM rails, or the front using the FCM fork-lift rails 72. Therefore, the space which must be reserved as service clearance for the fuel cell enclosure 10 is reduced, as a fork-truck or pallet jack is never forced to approach the power module 12 from a "head on" direction. Further, the sliding of the FCM 70 from the power module 12 using rollers, a lead-screw, an air cushion or another suitable method allows a single field service person to be able to load and unload FCM 70.

Figure 23A:
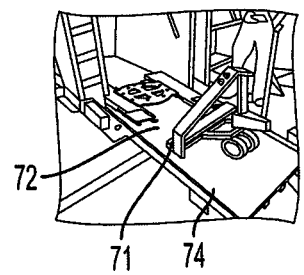
FIGS. 23A-C illustrate (A) an alternative removal tool; (B) an embodiment of a removable support and (C) another view of the removable support illustrated in 23(B).
Figure 23B:
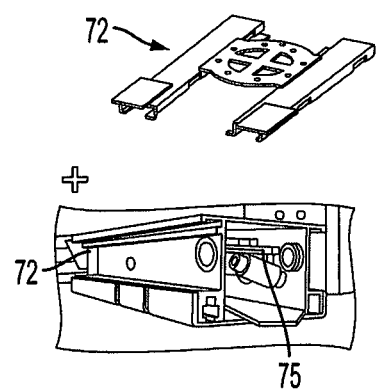
Figure 23C:
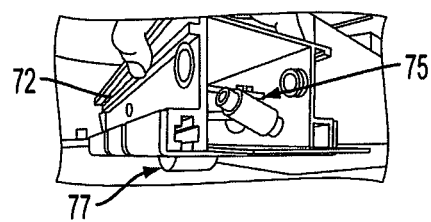

FIG. 23A illustrates an alternative removal tool 71 to a fork lift. In this embodiment, the removal tool 71 is a pallet jack which includes forks adapted to fit the rails of the moveable support 72. The pallet jack includes a lifting mechanism to engage the forks of the pallet jack with the rails of the movable support. After sliding the forks into the rails, the forks are lifted until the weight of the movable support 72 and the FCM 70 are supported by the forks. The movable support 72 may then be rolled out of the enclosure 12 by the jack 71. Any suitable lifting mechanism may be used in the removal tool, such as mechanical or pneumatic lifting mechanisms FIGS. 23B and 23C illustrate an exemplary embodiment of an alternative removable support 72. In this embodiment, the movable support 72 includes air rollers located at the bottom of the movable support 72. Air rollers are a pneumatic device that include one or more air bladders 75 operatively connected to retracted wheels/rollers 77. The air rollers are activated by attaching an air source (e.g., an air tank, not shown) to the air bladder. Air from the air source engages one or more air bladders 75, which in turn cause the wheels 77 to extend/lower from the retracted position. The wheels 77 may comprise conventional solid metal or plastic wheels which are pushed down out of the rails 72 by the inflation of the bladder 75. Alternatively, the wheels 77 may comprise inflatable wheels, rollers or tube made of an inflatable shell which is inflated with air from the air bladder 75 to form inflated rollers, wheels or tube. The inflated rollers, wheels or tube distribute the weight of the FCM over the entire base/rails 72 and span the gaps between the rails 72 and pallet 74. When the wheels 77 are extended, the movable support 72 (with the FCM attached) can be rolled or pulled out of the enclosure 10 onto the pallet 74 manually or using a pallet jack 71 show in FIG. 23A.

Desulfurizer Assembly

Referring now to FIGS. 17-21, the input/output module 14 may include a desulfurizer assembly 80. The desulfurizer assembly 80 is provided in the enclosure 10 for pre-processing of the fuel to reduce the amount of organosulfur compounds and/or other impurities. Reducing organosulfur compounds in the incoming fuel reduces contamination of the fuel cells in hot box 13.

Prior art fuel cell systems often use two large, cylindrical desulfurizer canisters in series. Each canister contains a desulfurizer material bed which removes sulfur from the inlet fuel stream being provided to the fuel cells. When the sulfur is expected to have broken through the bed in the first canister, both canisters are exchanged for a new set of canisters or the desulfurizer material bed is replaced in both canisters. However, the second canister or second desulfurizer material bed is replaced before being completely used up because the second bed still has the ability to adsorb more sulfur. In other words, as trace amounts of sulfur species begin to break through the first bed, the additional capacity to adsorb higher sulfur concentrations is never utilized in the second bed. Thus, underused bed material is discarded, leading to a higher system cost.

Figure 17:
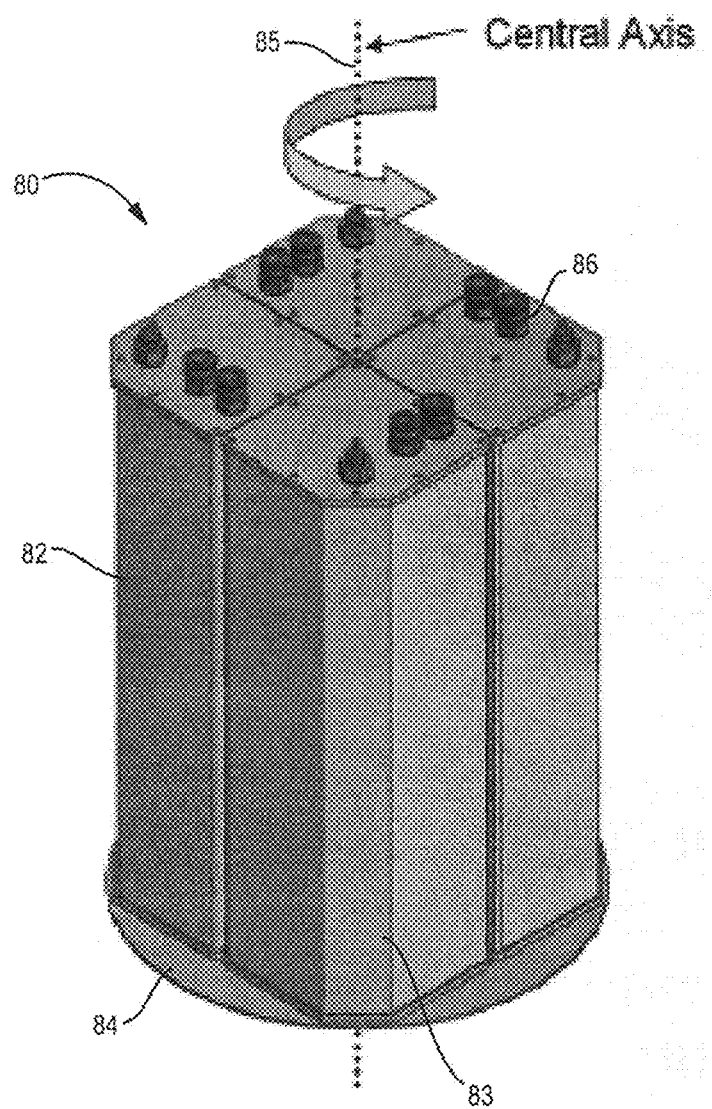
FIG. 17 is an isometric view of rotatable desulfurizer assembly for the fuel cell system of FIG. 1 according to an exemplary embodiment.

Referring to FIG. 17, a desulfurizer assembly 80 includes four vessels 82 (e.g., canisters, tanks, etc.) each containing a desulfurization material, such as zeolite, etc. beds. While four canisters 82 are shown, the assembly may contain any suitable number of canisters, such as two, three or more than four (e.g., five to eight). The incoming fuel inlet stream for the fuel cells passes through the canisters 82 in series. The canisters 82 are arranged on a rotatable pad 84 that rotates about a central axis 85. The rotatable pad 84 allows easy access and separate servicing of each canister 82 without disturbing the operation of the other canisters 82. Using four canisters 82 arranged as shown in FIG. 17 allows for longer life and more complete utilization of bed materials in the canisters than cascade arrangement of two beds or canisters.

The canisters 82 are generally rectangular prismatic bodies with a beveled edge 83. The beveled edge 83 helps to properly orient the canister 82 on the rotatable pad 84. The beveled edge 83 further allows for better space utilization when rotating all four canisters 82 together by eliminating a corner of the canister 82 that would otherwise extend beyond the rotatable pad 84 and interfere with the rotation of the desulfurizer assembly 80. Tall, narrow canisters 82 allow for use of a deeper, more narrow cabinet space in the input/output module 14.

Referring to FIGS. 18-21, each of the canisters 82 have four internal channels 86 (e.g., subdivisions, chambers, etc.), with the fuel passing through each of the channels 86 in the canister 82 in fluid series (i.e., such that the fluid, such as a fuel inlet stream flows through each of the canisters in series). The desulfurizer assembly 80 therefore essentially has sixteen channels 86 in fluid series. The canister 82 is a low cost design which can be manufactured using extrusion methods. The relatively large length/diameter ratio of the channel 86 increases material efficiency. The geometry of the channels 86 causes a moderate pressure drop and relatively uniform flow of the fuel inlet stream. Bulk mixing occurs at four points in each canister 82, reducing edge effects and bypass.

The desulfurizer assembly 80 may further contain a sulfur sensor or detector to detect sulfur that has broken through the final canister 82 in the series. Having four canisters 82 in series allows for gas sampling after each canister 82. According to an exemplary embodiment, the sulfur detector is a resistor connected between voltage or current terminals. The resistor may comprise a metal strip or other conductor which has a reference resistance when new. The metal of the strip reacts in the presence of sulfur containing compounds, forming reaction bi-products such as metal sulfides, which have a higher electrical resistance. During operation of the assembly 80, a resistance measurement is made across the metal strip via a sensing circuit. When the resistance begins to shift to a higher value, the sensor is providing indication of the presence of sulfur. The detectors are placed down-stream of one or more channels 86. As the sensors indicate the presence of sulfur, the breakthrough of sulfur compounds can be inferred, allowing the operator of the fuel cell enclosure 10 to schedule a maintenance activity to exchange and rotate canisters 82.

Figure 22:
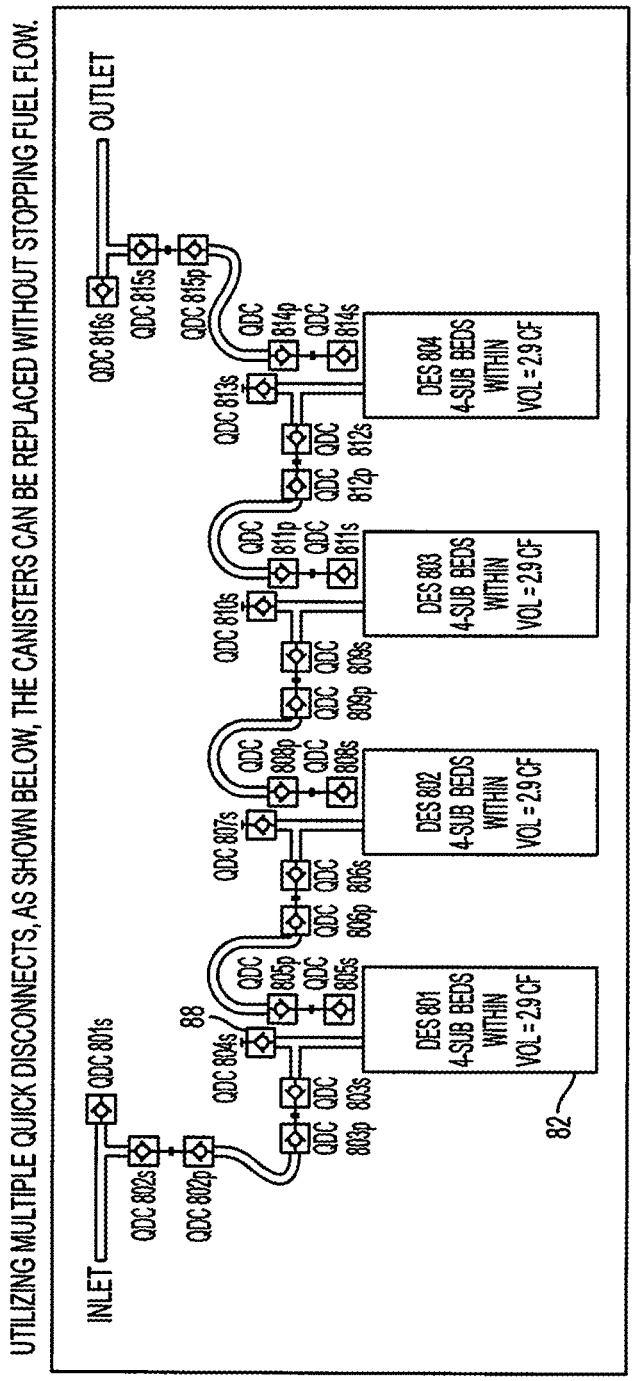
FIG. 22 is a schematic diagram showing plumbing connections for the canisters of the rotatable desulfurizer assembly of FIG. 17 according to an exemplary embodiment.

All inputs and output (I/O) connections 88 for the canisters 82 are provided on the same side (e.g., the top side) of the desulfurizer assembly 80. The I/O connections 88 are swiveling leak-tight connections. Swiveling connections allows for the desulfurizer assembly 80 to continue operating as it rotates about the central axis 85. For example, as shown in FIG. 22, the assembly 80 contains four canisters DES 801, DES 802, DES 803 and DES 804 and I/O connections 88, such as quick connects/disconnects 801*s* to 815*s*.

Each of the canisters 82 in series can absorb organosulfur compounds until the saturation level results in organosulfur compounds escaping the canister 82 without being absorbed. In normal operation of the desulfurizer assembly 80, the first three canisters 82 in series are allowed to break through. Once a sulfur sensor detects organosulfur compounds breaking through the third canister 82 in the series (e.g., DES 803), the first canister 82 in the series (e.g., DES 801) is bypassed and then removed. The canister DES 801 may be bypassed by closing connection 803*s*-803*p* and connecting connection 802*s* to connection 805*p*. This way, the fuel inlet stream travels from the inlet directly through connection 802*s*-805*p* into the second canister DES 802 bypassing canister DES 801. Canister DES 801 is then removed from the assembly 80 to be refilled with fresh desulfurizer material. The canisters 82 are rotated 90 degrees so that the canister 82/DES 802 that was originally second in the series is placed in the first position. Likewise, the canister 82/DES 802 formerly third in the series is moved into the second position and the canister 82/DES 804 formerly last in the series is moved to the third position. A new canister 82 is then placed in the fourth position. The new canister may be connected into the fourth position by having its inlet connected to connection 815*p* and its outlet connected to connection 815*s* while these two connections are bypassed. By doing this, each canister 82 is able to collect sulfur even after sulfur has broken through the third canister 82/DES 803.

Arranging the canisters 82 on a rotatable pad 84 avoids confusion by making rotation procedure a constant. The use of four canisters 82 allows connections between middle canisters 82 in the cascade series to remain undisturbed while a spent canister 82 is being removed and a new canister 82 installed. Because of the arrangement of the canisters 82 on the rotatable pad 84, all four canisters 82 can be brought in close proximity to the front of the module 14 cabinet (e.g., to within 14 inches to meet UL requirements in the United States). The I/O connections 88 allow the inlet and the outlet plumbing to stay in the same place while the canister 82 change their place in order.

While the desulfurizer assembly 80 described above includes loose desulphurization material in a generally rigid canisters 82, in another exemplary embodiment, desulfurization material may be pre-loaded into gas permeable bags. Then, the packaging of the desulfurization material into the desulfurization canister 82 is simplified via loading the bags into the canister structure—thereby eliminating the need to pour material into place. This further makes disassembly simpler because the bags may be quickly removed. Handles, ropes or other features might be attached to the bags to aid in removal of bags of spent material from the canisters 82. While a desulfurization assembly is described above, any other adsorption bed assembly other than a desulfurization assembly may include a rotatable support and a plurality of vessels arranged on the rotatable support, where each vessel contains an adsorption bed.

The construction and arrangements of the fuel cell system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure. Any one or more features of any embodiment may be used in any combination with any one or more other features of one or more other embodiments.

The invention claimed is:

1. A modular fuel cell system, comprising:
   a base;
   at least one power module arranged in a row on the base; and
   a fuel processing module and a power conditioning module arranged on at least one end of the row on the base;
   wherein:
      each power module comprises a separate cabinet comprising at least one fuel cell stack located in a hot box;
      the at least one power module is electrically and fluidly connected to the fuel processing and the power conditioning modules through the base; and
   wherein the cabinet comprises:
      a cabinet housing: and
      a door on the housing, wherein the door is configured to open within 0 to 30 degrees of a vertical swing and then within 0 to 30 degrees of a horizontal swing.

2. The system of claim 1, wherein the fuel processing and power conditioning modules are located in a common input/output cabinet.

3. The system of claim 1, wherein the fuel processing module is located in a first cabinet and the power conditioning module is located in a second cabinet which is separate from the first cabinet.

4. The system of claim 3, wherein the first cabinet, the second cabinet and each power module cabinet have doors facing perpendicular to an axis of the row.

5. The system of claim 1, wherein the fuel processing module comprises at least one adsorption bed and the power conditioning module comprises a DC/AC converter, electrical connectors for AC power output and a system controller.

6. The system of claim 1, wherein each power, fuel processing and power conditioning module may be serviced, repaired or removed from the system without opening the remaining module cabinets in the system and without taking off line, servicing, repairing or removing the other modules in the system.

7. The system of claim 1, wherein the base comprises a pre-cast concrete, geopolymer or steel base comprising channels which contain electrical bus bar conduits, input and output fuel conduits and at least one water conduit which extend to the system, from the system, or between the modules.

8. The system of claim 1,
   wherein:
   the door comprises one or more inner portions and one or more outer portions; and
   the outer portions may be opened while the inner portions remain closed or the outer portions comprises a different material than the inner portions.

9. The system of claim 8, wherein:
   the inner portion forms a framework for the door and couples the door to the cabinet housing; and the outer portion is coupled to the inner portion and provides an outer fascia for the door.

10. The system of claim 9, wherein the outer portion is formed of non-fire resistant polymer material and the inner portion is formed of a fire resistant material selected from metal and fire resistant polymer material.

11. The system of claim 9, wherein the entire door is injection molded as a single structure made of different materials or is made by vacuum thermoforming, such that the inner portion is made from a heat and flame resistant plastic sheet, and the outer portion is made from a plastic that is weather resistant and has a lower heat and flame resistance than the inner portion.

12. The system of claim 8, further comprising at least one air filter located in a space between the inner and outer portions of the door, such that the outer portion may be opened while the inner portion remains closed.

13. The system of claim 12, wherein:
the at least one filter comprises a plurality of the filters which are located over each other in the space between the inner and the outer door portions;
the filters are supported on the inner surface of the outer portion;
an edge of the door between the inner and outer portions comprises an air inlet opening to the space between the inner and outer door portions; and
the inner door portion includes an air outlet opening into an interior of the cabinet.

14. The system of claim 13, further comprising at least one perforated screen located in an air flow path between the air inlet opening and the at least one filter;
wherein:
a width of the space between the inner and outer door portions is larger than that of the air inlet opening; and
the space between the inner and outer door portions provides an air flow path comprising at least one turn of at least 90 degrees between the air inlet opening and the at least one filter such that debris in the air flow falls to a bottom of the space.

15. The system of claim 8, wherein the inner portion and the outer portion of the door are configured to open in tandem within 0 to 30 degrees of the vertical swing and then within 0 to 30 degrees of the horizontal swing.

16. The system of claim 1, wherein:
the door opens by being moved up and then at least partially over the top of the cabinet within 0 to 30 degrees of a horizontal direction;
the door is mounted onto walls of the cabinet with plural independent mechanical arms;
the plural independent mechanical arms comprise two arms provided on a first side of the door and two arms provided on a second side of the door;
a first arm on the first side of the door comprises a first, generally straight end attached to an interior wall of the cabinet and a second, generally curved end attached to the door;
a second arm on the first side of the door comprises a first, generally curved end attached to the interior wall of the cabinet and a second, generally straight end attached to the door;
the second arm is longer than the first arm; and
in an open position, an upper portion of the door is located over a top surface of the cabinet and a lower portion of the door overhangs an opening to the cabinet.

17. The system of claim 1, further comprising a latch located inside the door between inner and outer portions of the door.

18. The system of claim 17, wherein the latch comprises:
a side handle;
at least one biasing member;
a wheeled latch actuating mechanism; and
a catch coupled to a frame of the cabinet;
wherein the side handle is hinged so that movement of the handle in a circular motion in a plane parallel to a front surface of the door causes the wheeled latch actuating mechanism to slide to a side to disengage or engage the catch.

19. The system of claim 1, further comprising an adsorption bed assembly, comprising:
a rotatable support; and
a plurality of vessels arranged on the rotatable support, each vessel containing an adsorption bed.

20. The assembly of claim 19, wherein:
the assembly comprises a desulfurizer assembly for the fuel cell system;
the adsorption bed comprises a bed of at least one of an impurity adsorption or desulfurization material; and
the plurality of vessels are connected in fluid series.

21. The assembly of claim 20, wherein each vessel comprises a canister having a generally rectangular prismatic body with a beveled edge and a plurality of separate internal channels and wherein all inputs and output connections for the plurality of vessels comprise swiveling leak-tight connections arranged on the same side of the assembly.

22. The assembly of claim 20, further comprising a species sensor to detect sulfur or other contaminant that has broken through a vessel in the fluid series.

23. The system of claim 1, wherein the base comprises two or more pre-cast concrete or geopolymer sections.

* * * * *